United States Patent
Schöb et al.

(10) Patent No.: US 6,355,998 B1
(45) Date of Patent: Mar. 12, 2002

(54) SENSOR ARRANGEMENT IN AN ELECTROMAGNETIC ROTARY DRIVE AND A METHOD FOR THE OPERATION OF A ROTARY DRIVE OF THIS KIND

(75) Inventors: Reto Schöb, Volketswil; Natale Barletta, Zürich, both of (CH)

(73) Assignee: Levitronix LLC, Waltham, MA (US)

( * ) Notice: Subject to any disclaimer, the term of this patent is extended or adjusted under 35 U.S.C. 154(b) by 0 days.

(21) Appl. No.: 09/796,067

(22) Filed: Feb. 27, 2001

Related U.S. Application Data

(62) Division of application No. 09/368,403, filed on Aug. 4, 1999, now Pat. No. 6,222,290.

(30) Foreign Application Priority Data

Aug. 24, 1998 (EP) .............................. 98810833

(51) Int. Cl.⁷ ..................... H02K 11/00; H02K 7/09
(52) U.S. Cl. ..................... 310/68 B; 310/90.5
(58) Field of Search ........................ 310/68 B, 90.5, 310/68 R, DIG. 3, 156, 166, 168; 29/596, 598

(56) References Cited

U.S. PATENT DOCUMENTS

| | | | | |
|---|---|---|---|---|
| 3,194,990 A | * | 7/1965 | Kendall ................ 310/68 B |
| 4,339,875 A | * | 7/1982 | Muller ................ 29/602 R |
| 4,479,078 A | * | 10/1984 | Kidd et al. ................ 318/254 |
| 4,481,440 A | * | 11/1984 | Muller ................ 310/268 |
| 4,642,496 A | * | 2/1987 | Kerviel et al. ............ 310/68 B |
| 4,755,699 A | * | 7/1988 | Schmider ............ 310/68 R |
| 5,172,021 A | | 12/1992 | Takahashi ............ 310/90.5 |
| 5,442,250 A | * | 8/1995 | Stridsberg ............ 310/186 |
| 5,633,546 A | | 5/1997 | Horst ............ 310/68 B |
| 5,760,521 A | | 6/1998 | Ushiro ............ 310/268 |
| 5,831,359 A | * | 11/1998 | Jeske ............ 310/68 B |
| 5,866,962 A | | 2/1999 | Kim ............ 310/68 B |
| 5,880,586 A | * | 3/1999 | Dukart et al. ............ 324/207.2 |
| 6,100,618 A | | 8/2000 | Schoeb et al. ............ 310/90.5 |
| 6,222,290 B1 | * | 4/2001 | Schob et al. ............ 310/68 B |

FOREIGN PATENT DOCUMENTS

| | | |
|---|---|---|
| DE | 4141000 A1 | 6/1992 |
| WO | WO 90/03684 | 4/1990 |

\* cited by examiner

*Primary Examiner*—Nestor Ramirez
*Assistant Examiner*—Dang Dinh Le
(74) *Attorney, Agent, or Firm*—Townsend and Townsend and Crew LLP

(57) ABSTRACT

A sensor arrangement in an electromagnetic rotary drive which is designed as a bearing-free motor with a magnetically journalled, permanent magnetic rotor (1) and a stator (2), the sensor arrangement serving for the determination of the direction of the rotor magnetization and/or of the axial position of the rotor (1), comprises at least two sensors (S1, S2, S3) for the determination of a magnetic flux. The two sensors (S1, S2, S3) are arranged in such a manner with respect to the rotor (1) that partial fluxes of that magnetic field which the stray field of the permanent magnetic rotor (1) produces can be determined with them. Furthermore, a method for the determination of the direction of the rotor magnetization is proposed.

19 Claims, 13 Drawing Sheets

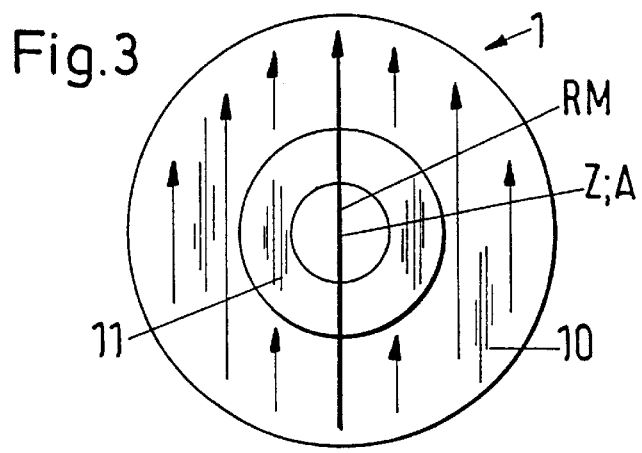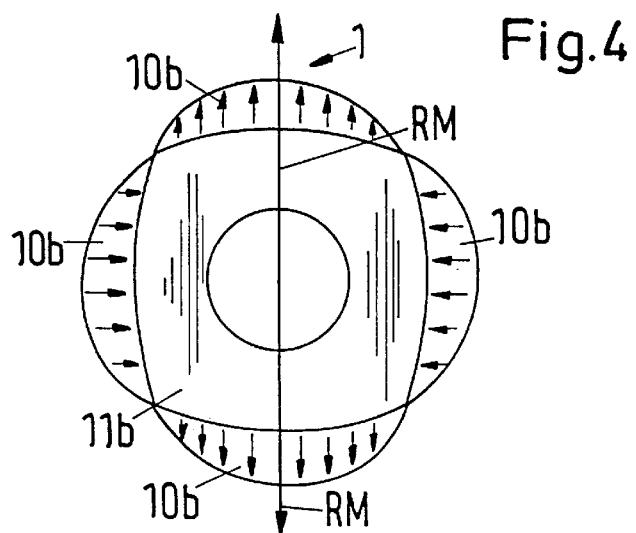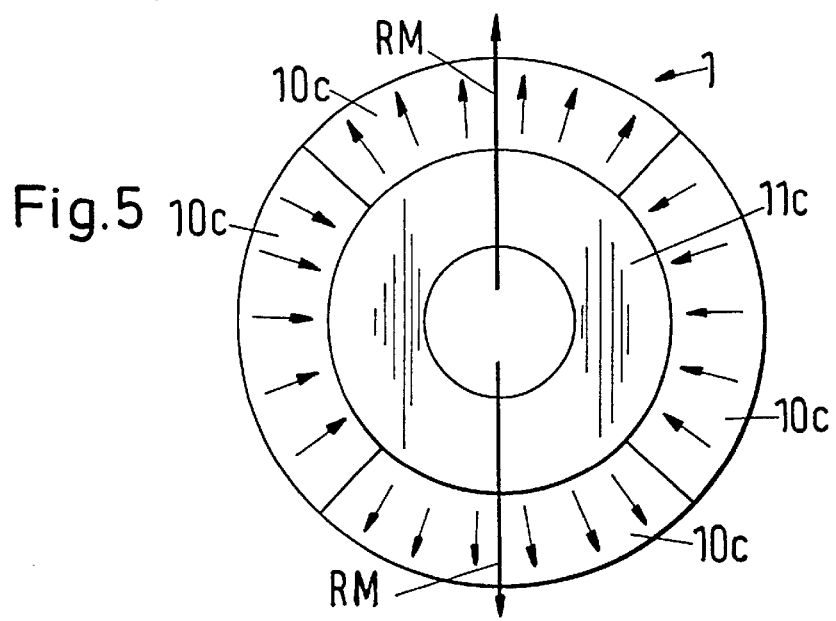

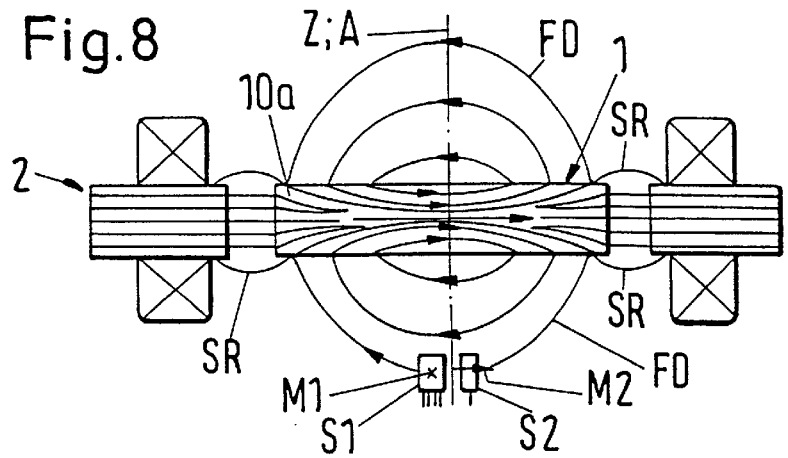
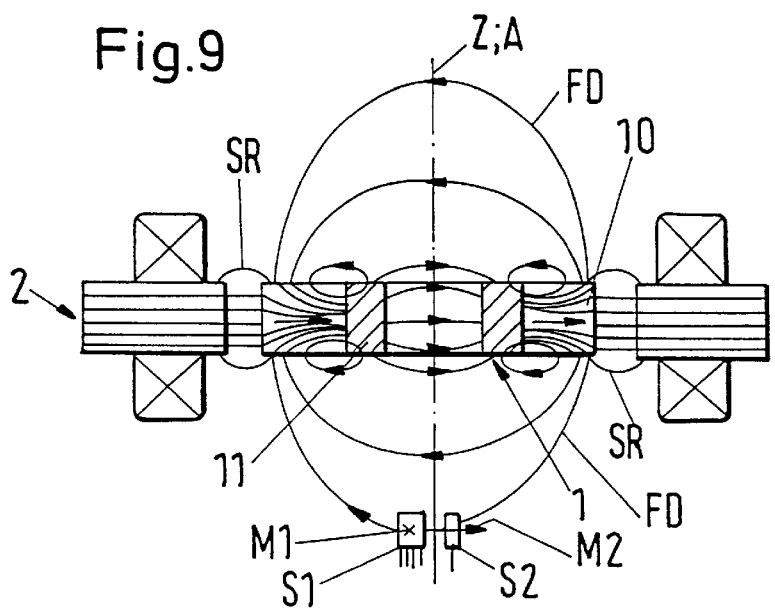
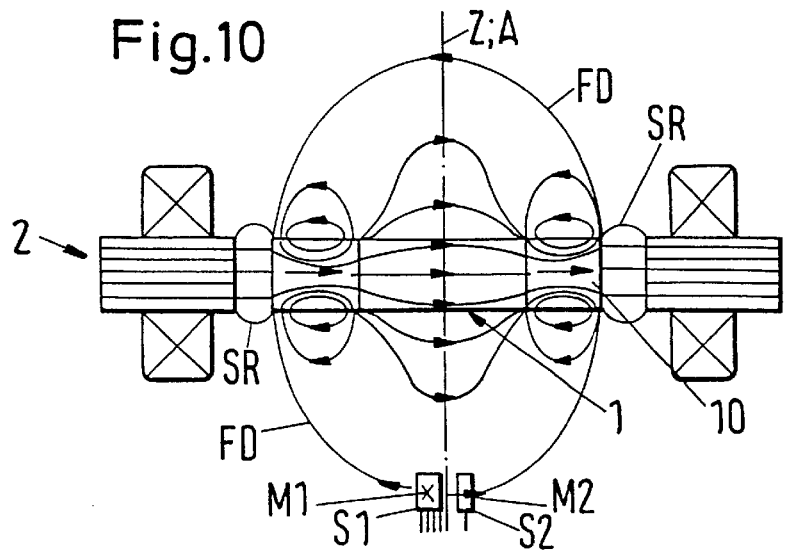

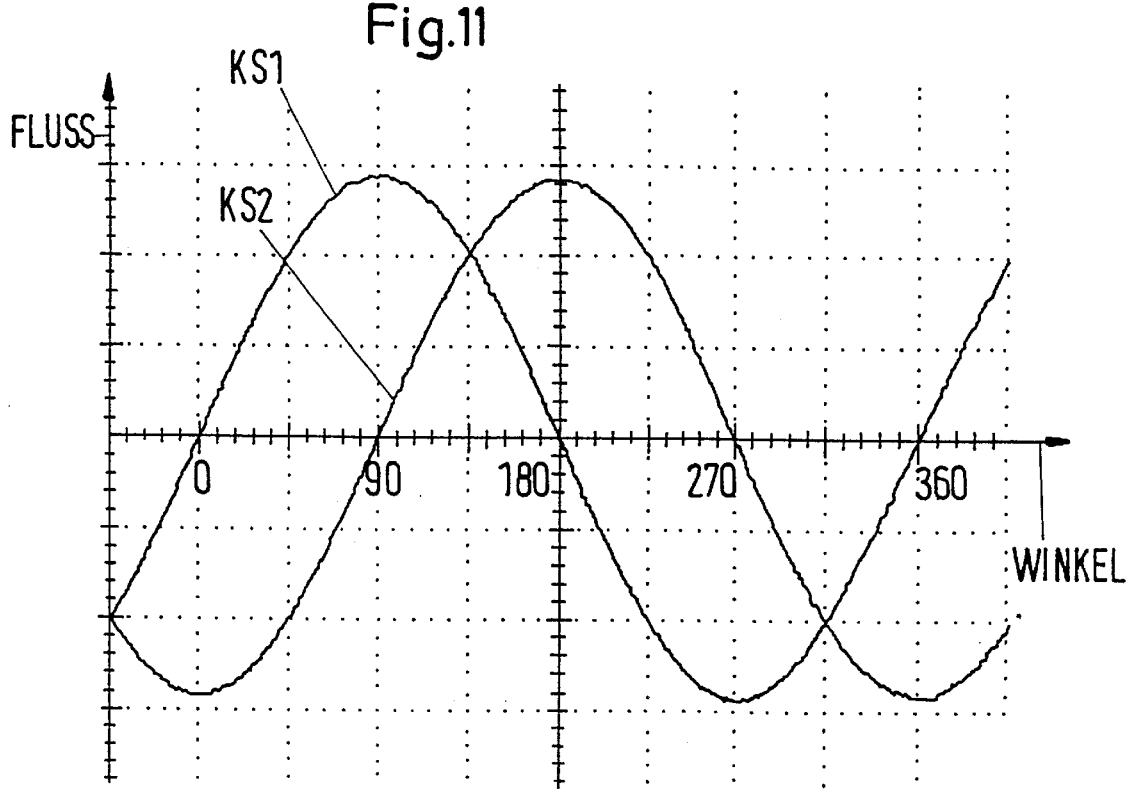
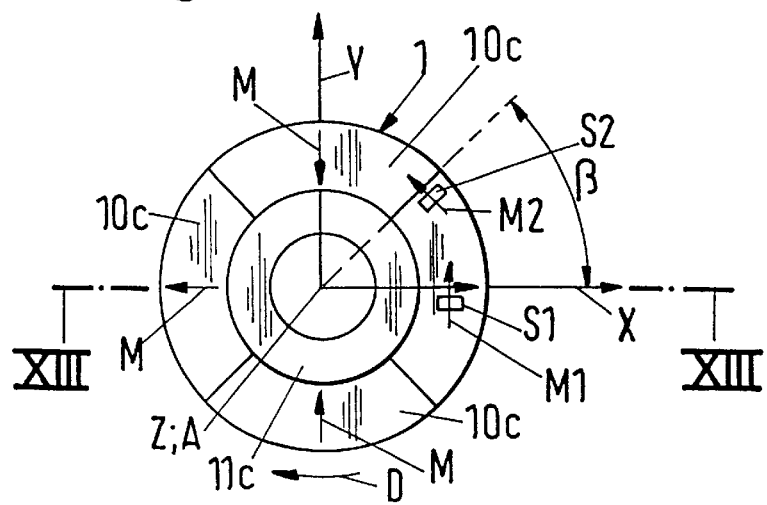

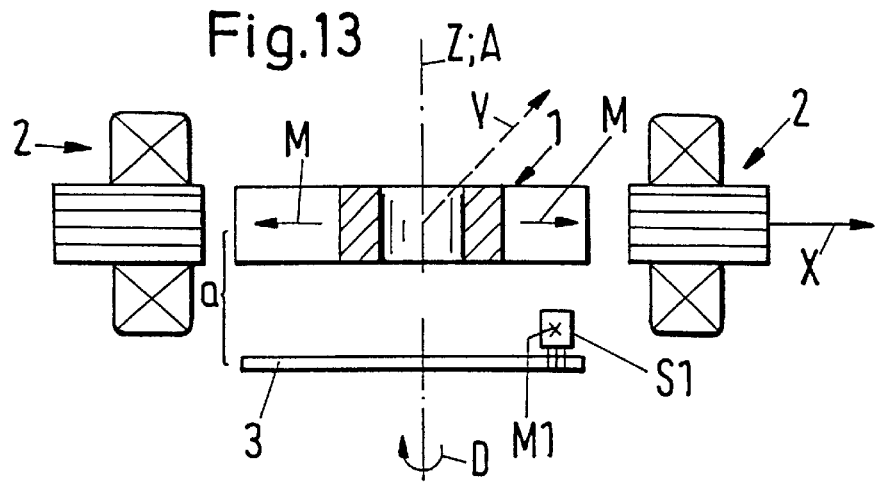
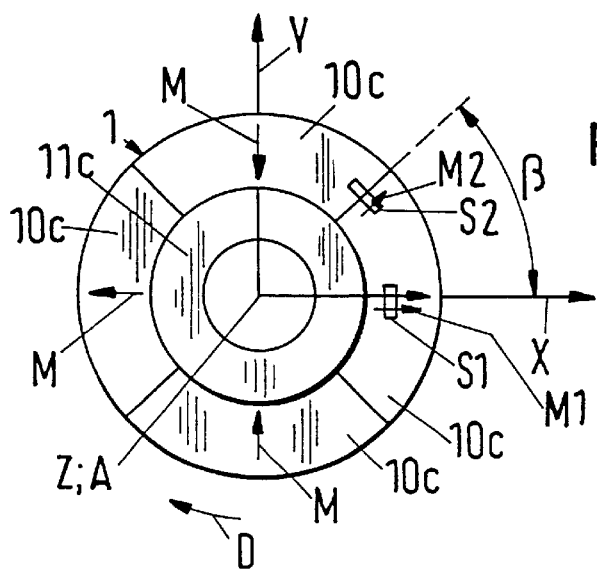
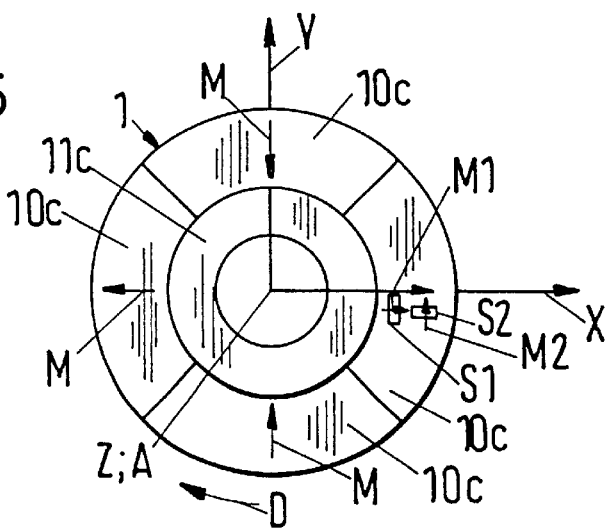

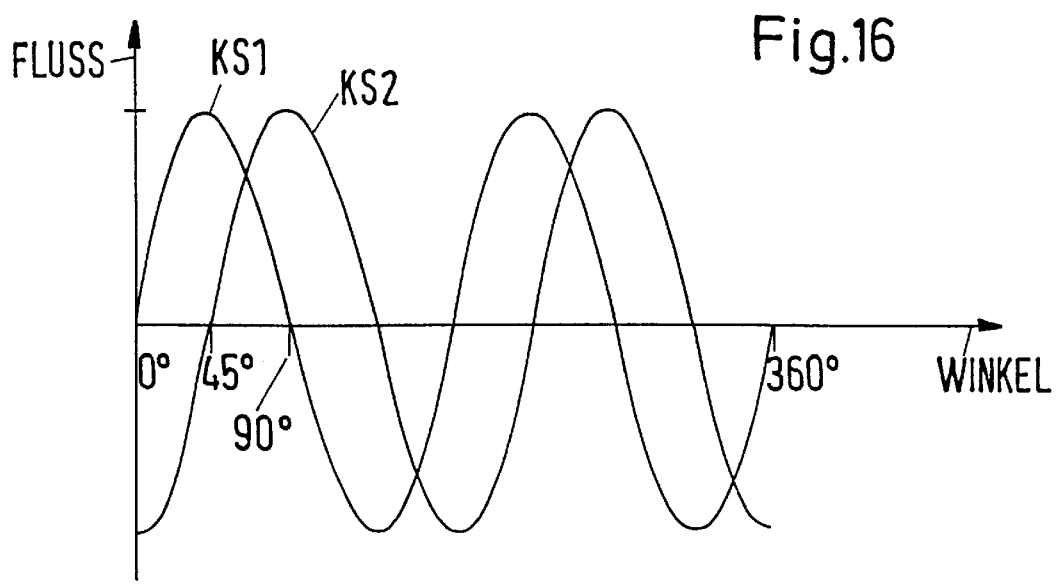
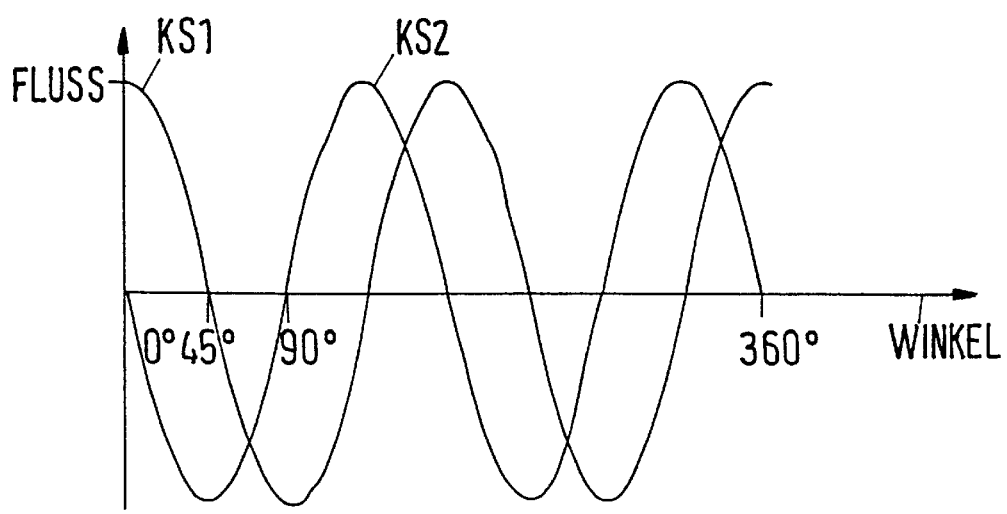
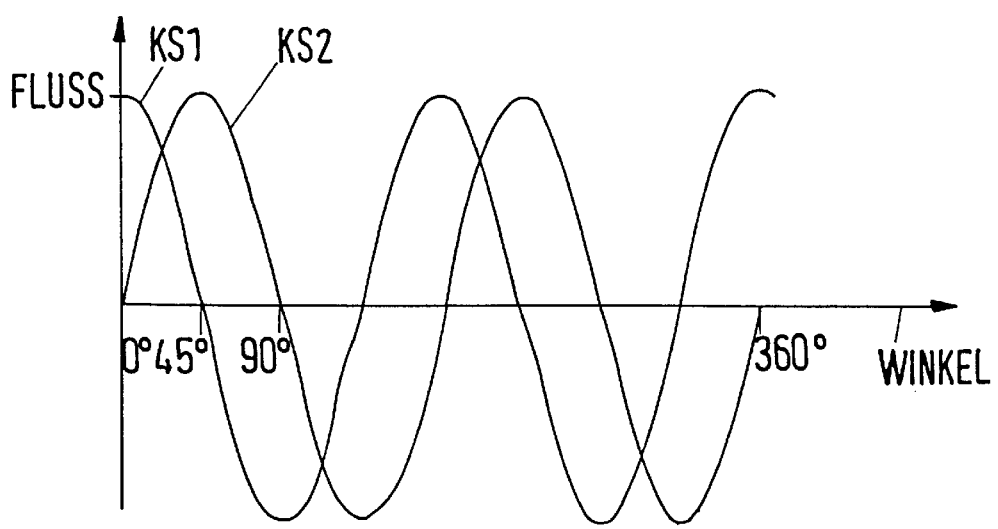
Fig.16

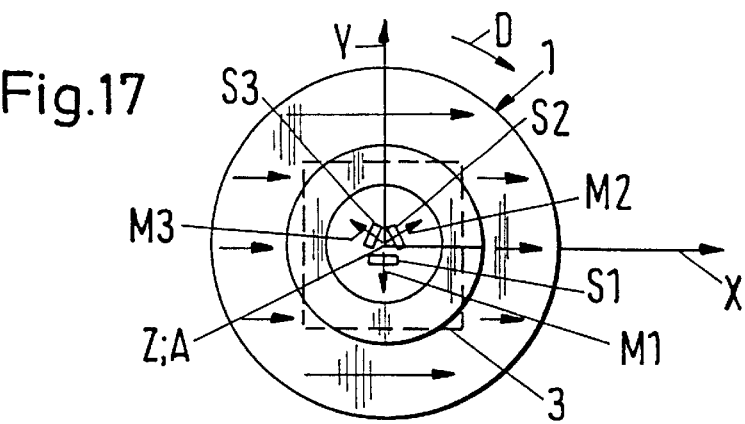
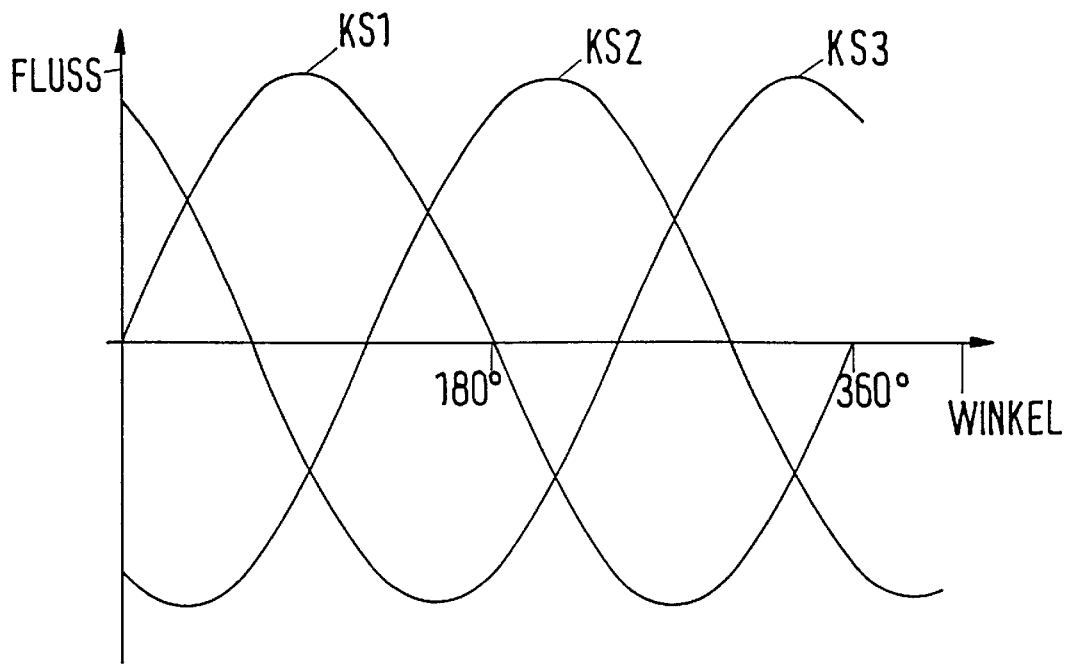
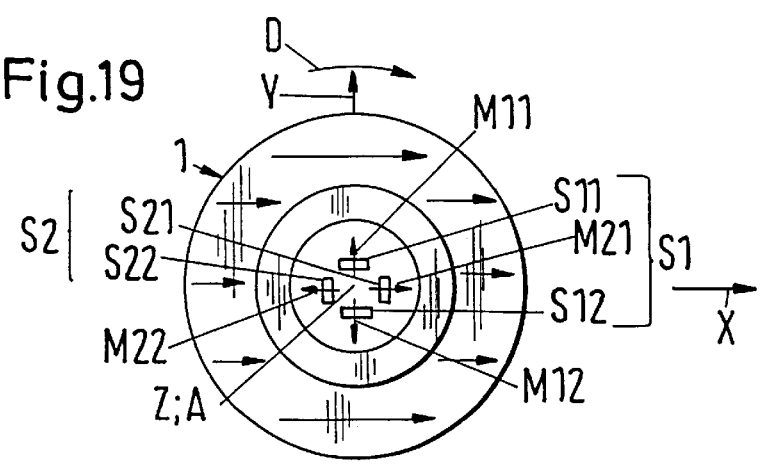

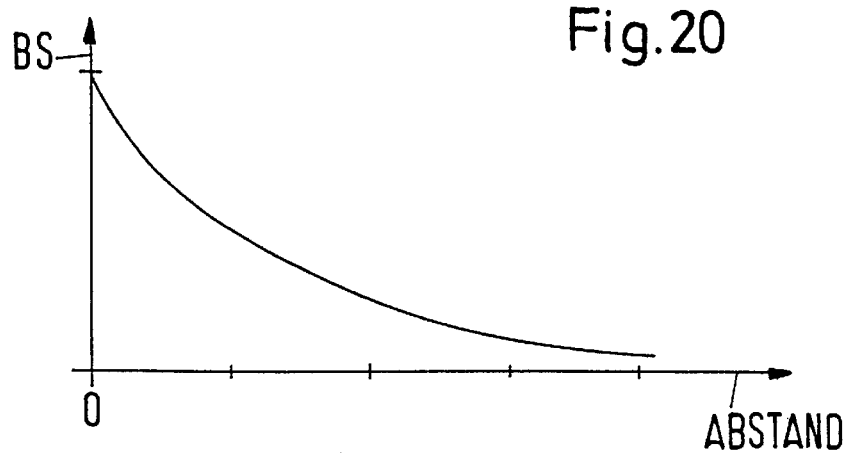
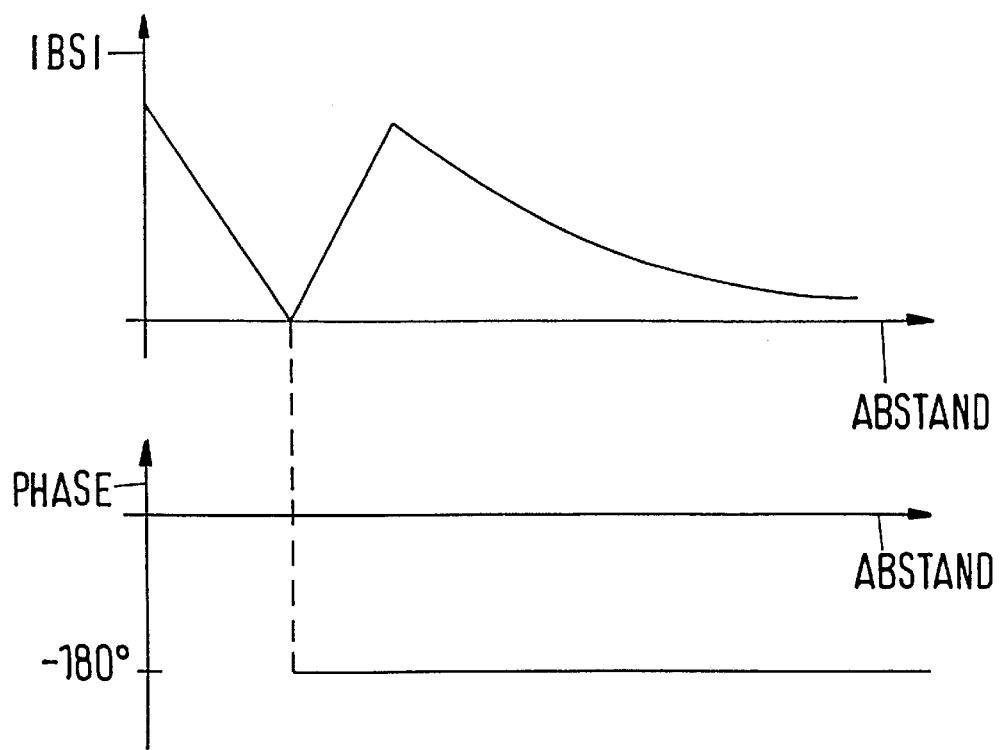

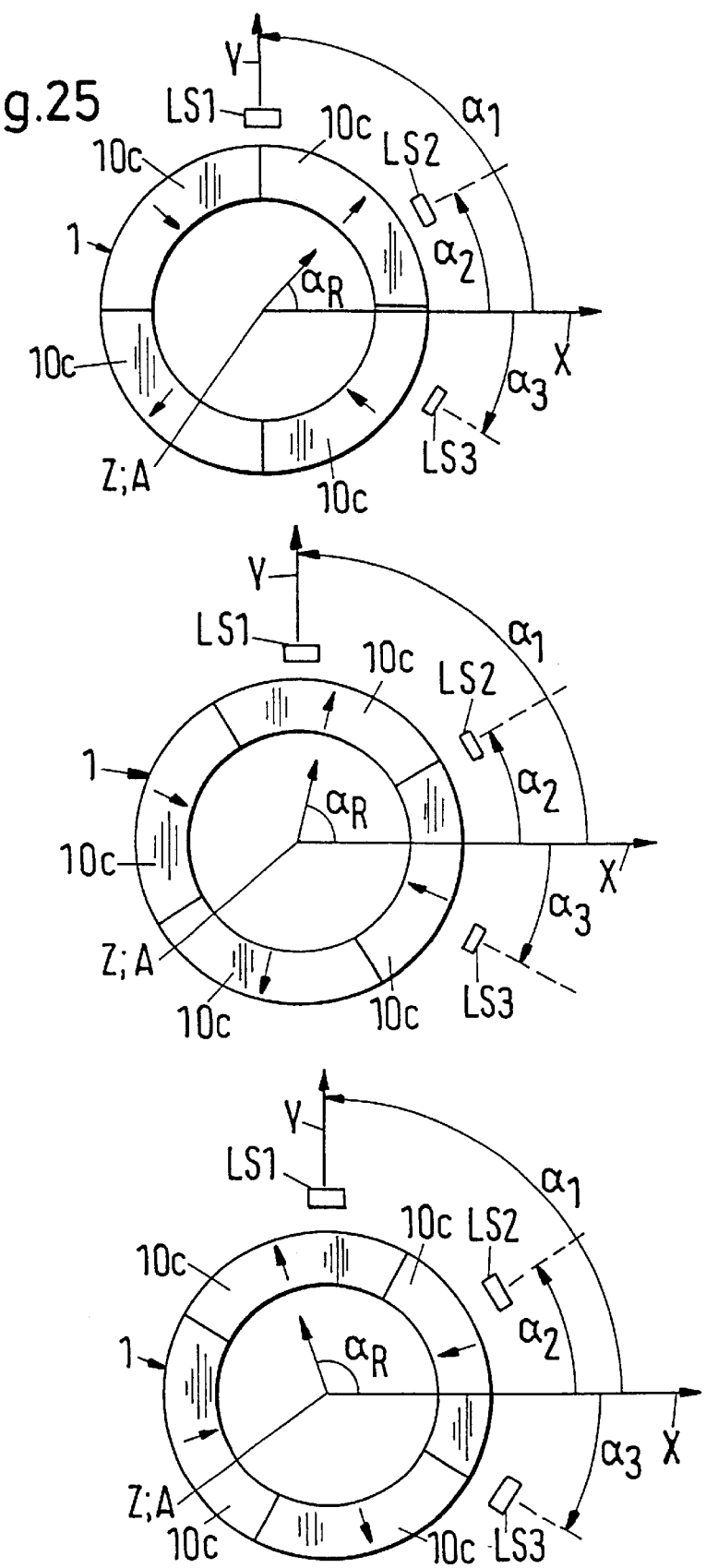

SENSOR ARRANGEMENT IN AN ELECTROMAGNETIC ROTARY DRIVE AND A METHOD FOR THE OPERATION OF A ROTARY DRIVE OF THIS KIND

This application is a division of U.S. patent application Ser. No. 09/368,403, filed Aug. 4, 1999, now U.S. Pat. No. 6,222,290, which claims priority from European patent application No. 98810833.8, filed Aug. 24, 1998.

BACKGROUND OF THE INVENTION

The invention relates to a sensor arrangement in an electromagnetic rotary drive which is designed as a bearing-free motor with a magnetically journalled, permanent magnetic rotor and a stator and to a method for the operation of a rotary drive of this kind.

A bearing-free motor with a permanent magnetic rotor is an electromagnetic rotary drive which comprises a permanent magnetically excited rotor and a stator, with the rotor being journalled without contact by means of magnetic forces. The characteristic to which the bearing-free motor owes its name is that it has no separate magnetic bearing for the rotor. For this the stator is designed as a bearing and drive stator and the rotor as a passive magnetic rotor which serves both as a bearing rotor and as a drive rotor. The stator is designed or provided with electrical windings respectively in such a manner that it produces an electromagnetic rotary field which exerts, on the one hand, a torque on the rotor which drives its rotation about the axis of rotation and which, on the other hand, exerts a transverse force on the rotor which can be set in any manner desired so that its radial position with respect to a plane perpendicular to the axis of rotation can be predetermined or actively controlled respectively. Thus in the operating state the rotor can be actively controlled and driven respectively by means of the electric windings of the stator with respect to three degrees of freedom, namely the rotation about the axis of rotation and the radial position in the plane perpendicular to the axis of rotation (two degrees of freedom).

With respect to three further degrees of freedom, namely tiltings with respect to the plane perpendicular to the axis of rotation (two degrees of freedom) and the axial position, the rotor is passively magnetically stabilized, that is, not in a controllable manner, by reluctance forces. Thus in the operating state the rotor can be both driven and journalled without contact through the magnetic interaction between the bearing/drive stator and the rotor without separate magnetic bearings being present for this. The term "bearing-free motor with a permanent magnetic rotor" is to be understood in this sense for the following explanations. With respect to further details of the design and of the excitation and regulation respectively of the bearing-free motor, reference is made here to Schoeb et al. U.S. Pat. No. 6,100,618 entitled Rotary Machine with an Electromagnetic Rotary Drive issued Aug. 8, 2000.

In Schoeb et al. U.S. Pat. No. 6,100,618 entitled Rotary Machine with an Electromagnetic Rotary Drive issued Aug. 8, 2000 a bearing-free motor of this kind is disclosed in the example of a rotation pump. In the latter the rotor of the bearing-free motor is provided with vanes and thus forms an integral rotor, which means that it takes over the function of the rotor of the pump in addition to the function of the rotor of the electric motor. Pumps of this kind are advantageous in particular for those uses in which the fluid to be forwarded must not be contaminated, for example for the forwarding of biological liquids such as blood or highly pure liquids such as purest water. In addition rotation pumps of this kind are suitable for the forwarding of aggressive liquids which would destroy mechanical bearings in a short time.

In comparison with conventional pumps with a magnetically journalled rotor, pumps of this kind, which operate in accordance with the principle of the bearing-free motor, have the advantage of being extremely compact and space-saving and nevertheless having all the advantages of the non-contact magnetic journalling of the rotor even at high performance or forwarding power respectively. This is one of the reasons why pumps of this kind are suitable among other things as blood pumps for uses inside and outside the body.

For the operation of a bearing-free motor with a permanent magnetically excited rotor, in particular for the regulation of the drive and the position of the rotor, which usually takes place by means of a vector regulation method or a field-oriented regulation method respectively, it is necessary to know the direction of the rotor magnetization, that is, the momentary position of the magnetization of the rotor relative to the stationary stator system. In accordance with Schoeb et al. U.S. Pat. No. 6,100,618 entitled Rotary Machine with an Electromagnetic Rotary Drive issued Aug. 8, 2000 it is proposed for this to arrange four magnetic field probes in the air gap between the stator and the rotor.

Even though this arrangement has proved its worth in practice, difficulties nevertheless result for several forms of the rotor magnetization. If for example the rotor is magnetized in a block pattern, then the signal measured in the air gap by the magnetic field sensors varies only very little—if at all—over a relatively large rotational angle of the rotor so that a unique determination of the momentary direction of the rotor magnetization is practically no longer possible. In such cases separate rotation sensors would then have to be provided.

SUMMARY OF THE INVENTION

One object of the invention is thus to propose a better sensor arrangement in a bearing-free motor with a permanent magnetically excited rotor which enables the direction of the rotor magnetization and thus also the geometrical rotor angle to be determined. In accordance with a further aspect the axial position of the rotor is also to be determinable by means of the sensor arrangement. It is furthermore an object of the invention to propose a corresponding method for the operation of a bearing-free motor with a permanent magnetic rotor.

In accordance with the invention a sensor arrangement in an electromagnetic rotary drive is thus proposed which is designed as a bearing-free motor with a magnetically journalled, permanent magnetic rotor and a stator, said sensor arrangement serving for the determination of the direction of the rotor magnetization and/or of the axial position of the rotor and comprising at least two sensors for the determination of a magnetic flux. The two sensors are arranged with respect to the rotor in such a manner that partial fluxes of that magnetic flux which the stray field of the permanent magnetic rotor produces can be determined with them.

In accordance with the invention the measurements for the determination of the position of the rotor magnetization and/or of the axial position of the rotor thus take place in the stray field of the rotor. Through this the direction of the rotor magnetization with respect to the stationary stator system—and thereby also the geometric angular position of the rotor—can also be determined in those cases in which the rotor magnetization is not continuously distributed over the rotor, for example in a block-patterned rotor magnetization. With the arrangement in accordance with the invention and the method in accordance with the invention respectively the momentary position and the direction of the rotor magnetization respectively can be reliably determined during the operation of the motor for all rotor magnetizations which are relevant in practice. Since in addition no separate rotation sensor, that is, one that is different from the actual rotor, is required for this, the sensor arrangement in accordance with the invention is particularly simple in regard to the apparatus and in particular also in regard to the mounting technology and is thereby economical.

A further advantage lies in that the axial position of the rotor with respect to the stator can be determined with the arrangement in accordance with the invention or the method in accordance with the invention respectively without further sensors being required for this. This also reduces the cost and complexity of the apparatus for the bearing-free motor, especially the number of sensors required, because two measurement values which are required for the operation, namely the direction of the rotor magnetization and the axial position of the rotor, can be measured by means of a single sensor system.

The sensors are preferably arranged in such a manner that the partial fluxes of the magnetic flux can be determined in a first measurement direction and in a second measurement direction, with the measurement directions in each case extending perpendicular with respect to the axial direction which is defined by the desired axis of rotation of the rotor, because the evaluation of the sensor signals is thereby simplified.

The rotor of the bearing-free motor is preferably designed in a disc or ring shape. The sensors are then arranged with a displacement from the rotor with respect to the axial direction, which means in particular above or below the rotor with respect to its desired axis of rotation. This is a particularly simple arrangement in order to measure in the axial stray field of the rotor. Naturally other geometries of the rotor, for example also bell-shaped ones, are also possible.

Independently of the special geometry of the rotor it is however advantageous to arrange the sensors outside the space which is located between the rotor and the stator. Thereby, namely, no sensors are required in the air gap between the stator and the rotor so that this air gap can be designed smaller, which has a very positive effect on the magnetic coupling between the stator and the rotor.

A further advantageous measure consists in arranging the sensors in a common measurement plane which extends perpendicular to the axial direction, because the evaluation of the sensor signals is further simplified through this.

The sensors are preferably arranged in such a manner that the first and the second measurement direction extend at an angle with respect to one another which is approximately 90° or is unequal to an integral multiple of the quotient of 180° divided by the number of pole pairs of the rotor. In regard to as good a signal measurement and evaluation as possible it has proved useful in practice to arrange the sensors in such a manner that the first and the second measurement direction extend at an angle to one another which is equal to the quotient of 90° divided by the number of pole pairs of the rotor.

In order to further increase the reliability of the determination of the direction of the rotor magnetization it is advantageous to provide at least one further sensor by means of which the partial flux of the magnetic flux of the stray field of the permanent magnetic rotor can be determined in a further measurement direction which is different from the first and the second measurement direction. Through this measure an error tolerance of the sensor arrangement can be achieved because the direction of the rotor magnetization can already be determined from two of the three sensor signals.

Furthermore, it is advantageous when each sensor comprises two sensor elements which are arranged so as to be displaced by 180° in the direction of rotation of the rotor with respect to the desired axis of rotation of the rotor and which thus lie pair-wise oppositely with respect to the desired axis of rotation. With an arrangement of this kind systematic errors such as common mode disturbances, offsets and thermal drifts can be compensated.

From the point of view of the assembly technology and in regard to a particularly simple evaluation of the sensor signals it is advantageous to arrange the sensors and/or the sensor elements in such a manner that they measure the diametral, the radial or the tangential partial flux at their location.

In accordance with a preferred further development of the sensor arrangement at least two position sensors are furthermore provided for the determination of the radial position of the rotor. The stator of a bearing-free motor with a permanent magnetically excited rotor typically has a plurality of stator teeth which extend radially in the direction towards the rotor. The position sensors are then arranged in such a manner that the magnetic flux in the space between the rotor and the stator can be measured with them at two different measurement locations. With an arrangement of this kind, in addition to the direction of the rotor magnetization and the axial position of the rotor, its radial position in the stator can also be determined.

Preferably the position sensors are in each case arranged in a gap between two adjacent stator teeth because through this measure the magnetic control flux for the control of the rotor position which flows through the stator teeth is not also measured by the position sensors.

In order that a reliable determination of the radial position of the rotor for every rotor angle is also possible for those rotor magnetizations which have zero crossings, at least three position sensors are preferably provided which are arranged in such a manner that with them the magnetic flux in the space between the rotor and the stator can be determined at three different measurement locations, the position of which is such that for each rotational angular position of the rotor, that is, for each rotor angle, the angular position of at least two measurement locations is different from the angular position of the zero crossings of the rotor magnetization.

It is also advantageous for the position sensors when each position sensor comprises two sensor elements which are arranged so as to be displaced with respect to one another by 180° in the direction of rotation of the rotor with respect to the desired axis of rotation of the rotor because the already mentioned systematic errors in the determination of the radial position of the rotor can also be thereby compensated.

The method in accordance with the invention for the operation of an electromagnetic rotary drive which is designed as a bearing-free motor with a magnetically journalled permanent magnetic rotor and a stator, in said method the direction of the rotor magnetization being determined with the help of at least two sensors for the determination of a magnetic flux, is characterized in that partial fluxes of that magnetic field which the stray field of the permanent magnetic rotor produces are used for the determination of the direction of the rotor magnetization.

For the previously mentioned reasons the following measures are also advantageous for the method in accordance with the invention:

the partial fluxes of the magnetic flux of the stray field are determined in a first and in a second measurement direction, said measurement directions in each case extending perpendicular with respect to the axial direction which is defined by the desired axis of rotation of the rotor;

the partial fluxes of the magnetic flux are determined outside the space which is located between the rotor and the stator;

the partial fluxes of the magnetic flux are in each case determined at the same axial distance from the rotor;

the difference signals of two sensor elements which in each case form a sensor and which are arranged with a displacement by 180° with respect to one another in the direction of rotation of the rotor with respect to the desired axis of rotation of the rotor are used for the determination of the direction of the rotor magnetization;

in each case the diametral, the radial or the tangential partial flux is determined by means of the sensors and/or the sensor elements.

The direction of the rotor magnetization is preferably determined by a trigonometric analysis of the partial fluxes or through a comparison of the partial fluxes with an electronic look-up table.

A further advantageous measure consists in computationally compensating the stray fields which are produced by the stator. This can for example take place in such a manner that the stray field of the stator is first measured with the sensors in a kind of calibration measurement which is carried out without the rotor and the values which are determined therefrom are written into a memory, e.g. an EPROM, and are stored there. Then during the operation of the bearing-free motor (with the rotor) the measurement values which are measured by the sensors can be corrected with respect to the signals resulting from the stray field of the stator.

In accordance with a further aspect of the method in accordance with the invention the partial fluxes of the magnetic flux of the stray field of the rotor are used for the determination of the axial position of the rotor. For this the relationship between the signals of the sensors and the axial position of the rotor are preferably stored in an electronic look-up table, and the axial position of the rotor is determined during the operation of the rotary drive from the partial fluxes of the magnetic flux with the help of this electronic look-up table.

In accordance with a preferred further development of the method in accordance with the invention the magnetic flux in the space between the rotor and the stator is furthermore determined at two different measurement locations and the radial position of the rotor is determined using the direction of the rotor magnetization, the magnetic flux of which is determined at the measurement locations in the space between the rotor and the stator and the flux distribution in the air gap when the rotor is centered. As has already been mentioned the stator of a bearing-free motor with a permanent magnetically excited rotor typically has a plurality of stator teeth which extend radially in the direction towards the rotor. By the space between the rotor and the stator then both the air gap between the stator teeth and the rotor and the gaps between the stator teeth are meant.

As has previously been explained in connection with the sensor arrangement, in the method in accordance with the invention the magnetic flux in the space between the rotor and the stator is also preferably determined at least at three different measurement locations which are chosen in such a manner that for each rotational angular position of the rotor, that is, for each rotor angle, the angular position of at least two measurement locations is different from the angular position of the zero crossings of the rotor magnetization.

It is also advantageous for the method in accordance with the invention to additionally determine the magnetic flux in the space between the rotor and the stator at those locations which are displaced by 180° with respect to the measurement locations when viewed in the direction of rotation of the rotor and to use them for the determination of the radial position of the rotor because systematic errors can be compensated through this.

The invention will be described in more detail in the following, both in relation to the aspects of the apparatus and of the technology of the method, with reference to exemplary embodiments and with reference to the drawings. In the drawings, parts which are identical or have equivalent functions are provided with the same reference symbol. The schematic drawings are not to scale.

BRIEF DESCRIPTION OF THE DRAWINGS

FIGS. 2 to 5 are symbolic illustrations of the rotor magnetization in each case for different embodiments and magnetizations of the rotor, FIG. 11 is an illustration of two partial fluxes of the axial stray field of a bipolarly magnetized rotor, FIG. 12 is a plan view of a second exemplary embodiment of the sensor arrangement in accordance with the invention, FIG. 3b is an illustration of the radially extending field lines of the stray field of the quadrupolarly magnetized rotor of FIG. 13a, FIGS. 14 to 15 are views similar to FIG. 12, but illustrate variants of the second exemplary embodiment, FIG. 16 an illustration of two partial fluxes of the axial stray field in each case for a rotor which is quadrupolarly magnetized in a block pattern and a sensor arrangement in accordance with FIG. 12 (above), FIG. 14 (middle) and FIG. 15 (below), FIG. 17 is a plan view of a variant of the exemplary embodiment in accordance with FIG. 6 (without the stator), FIG. 18 is an illustration of three partial fluxes which can be determined with the sensor arrangement in accordance with FIG. 17, FIG. 19 is a plan view of a further variant of the exemplary embodiment in accordance with FIG. 6 (without stator), FIG. 20 is an illustration of the plot of the amplitude of the axial stray field for a diametrically magnetized, disc-shaped rotor, FIG. 21 is an illustration of the plot of the amplitude and of the phase of the axial stray field for a rotor in accordance with FIG. 9, FIG. 25 shows respective illustrations of a possible arrangement of the position sensors for a variant with three position sensors.

DETAILED DESCRIPTION OF SPECIFIC EXEMPLARY EMBODIMENTS

It was already explained initially what is to be understood by a bearing-free motor with a permanent magnetic rotor in the framework of this discussion. A bearing-free motor of this kind is an electromagnetic rotary drive with a permanent magnetic rotor 1 (see FIG. 1) which is rotatable about an axis of rotation A and which is journalled by means of magnetic forces. A stator 2 is provided which is designed as a bearing and drive stator, which means that no separate bearing apparatus is provided. For this the electric windings of the stator comprise for example—as is disclosed in the already cited Schoeb et al. U.S. Pat. 6,100,618 entitled Rotary Machine with an Electromagnetic Rotary Drive issued Aug. 8, 2000—a drive winding with a number of pole pairs p and a control winding with the number of pole pairs p±1 by means of which an electromagnetic rotary field can be produced which exerts both a driving torque and a transverse force which can be set as desired on the rotor 1. The permanent magnetic rotor 1 can thus be actively controlled or regulated respectively with respect to three degrees of freedom, namely the rotation about the axis of rotation A and its radial position with respect to a plane which is perpendicular to the axis of rotation (two degrees of freedom) and is passively magnetically stabilized through reluctance forces with respect to three further degrees of freedom, namely its axial deflection in the direction of the axis of rotation and tiltings with respect to the plane which is perpendicular to the axis of rotation A (two degrees of freedom).

Figure 1:
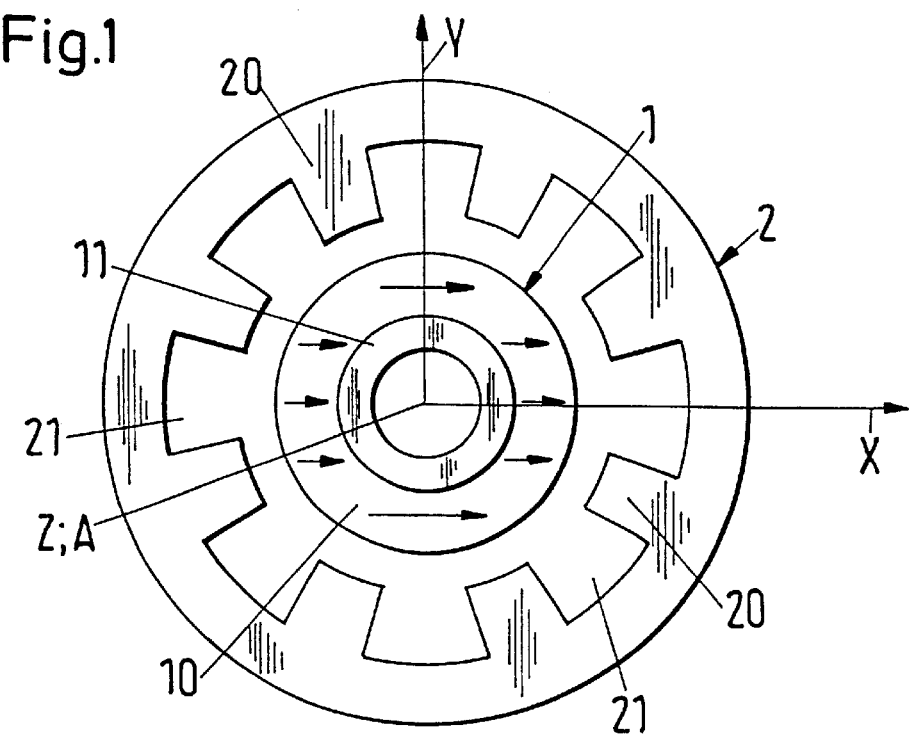
FIG. 1 is an illustration of essential parts of an exemplary embodiment of a bearing-free motor with a permanent magnetically excited rotor.

In FIG. 1 the essential parts of an exemplary embodiment of a bearing-free motor of this kind with a permanent magnetic rotor 1 are illustrated for a better understanding. In this exemplary embodiment the ring-shaped rotor 1 comprises a permanent magnetic ring 10, the magnetization of which is indicated by the arrows without reference symbols, and an iron yoke 11 which is arranged to lie radially inwardly with respect to the permanent magnetic ring 10. The rotor 1 is surrounded by a stator 2 which has a plurality of stator teeth 20 which extend in the direction towards the rotor 1 with gaps 21 lying between them. By means of electrical windings 22 (see e.g. FIG. 7) which are not illustrated in FIG. 1 and which are wound around the stator teeth 20 the already mentioned electromagnetic rotary field for the driving of the rotor 1 and for the active regulation of its radial position in the stator 2 can be produced. The supply, control and regulation devices which are required for this are not illustrated for reasons of greater clarity.

Usually two coordinate systems are used for the description of the bearing-free motor, in particular for its mathematical description, namely the stator system and the rotor system, which are defined as follows.

The stator system is a Cartesian coordinate system with the coordinate axes X, Y, Z which is stationary with respect to the stator 2, and the origin of which lies in the center of the stator 2, which means at the geometrical midpoint of the space which is surrounded by the stator 2. The Z axis points in accordance with its definition in the direction of the desired axis of rotation A of the rotor 1, by which is meant that axis of rotation about which the rotor 1 rotates in the operating state when it is in an exactly centered position with respect to the stator 2, as is illustrated in FIG. 1. In FIG. 1 the Z axis of the stator system is perpendicular to the plane of the drawing. The definition of the X and Y axes in the plane which is perpendicular to the Z axis and which contains the origin is arbitrary. The X-Y plane which is spanned by the X and the Y axis is consequently the plane in which the rotor 1 normally rotates during operation, which means in the event that it is not tilted or axially deflected.

The rotor system is likewise a Cartesian coordinate system with the coordinate axes X', Y', Z' (not illustrated), which however is stationary with respect to the rotor 1. Its origin lies in the geometrical center of the rotor 1, and is thus identical with the origin of the stator system when the rotor 1 is centered in the stator 2 with respect to the axial position (referred to the Z axis) and the radial position (referred to the X-Y plane). The Z' axis of the rotor system is defined by the axis of rotation about which the rotor 1 rotates; the definition of the X' and the Y' axes is again arbitrary. If the rotor 1 is exactly centered with respect to the stator 2 and rotates tilt-free—that is, about its desired axis of rotation A—during operation, the axis of rotation is the same as the desired axis of rotation A. Thus the Z axis of the stator system and the Z' axis of the rotor system coincide and the X' and the Y' axes of the rotor system rotate about this common Z axis.

In the following, by the term "axial direction" is meant the direction of the desired axis of rotation A, which is identical to the direction of the Z axis of the stator system. By "axial position" is meant the position with respect to the axial direction and by "radial position" is meant the position with respect to the X-Y plane of the stator system. In the following the concept of the rotor angle is used for the description of the angular position of the rotor 1 in the X-Y plane. The latter specifies the angle between the X' or Y' axis respectively of the rotor system, which is stationary with respect to the rotor 1, and the X or Y axis respectively of the stator system, which is stationary with respect to the stator 2. Let it be agreed on without a restriction of the generality that for the rotor angle zero the rotor 1 is oriented in the stator 2 in such a manner that the X' axis of the rotor system coincides with the X axis of the stator system.

For the operation of the bearing-free motor with a permanent magnetically excited rotor it is necessary to know the momentary direction or position of the rotor magnetization in the stator system, for example for the drive regulation, which typically takes place by means of a vector regulation or a field-oriented regulation respectively. Before it is now explained how this is determined in accordance with the invention, several possible embodiments of the permanent magnetic rotor 1 and of the rotor magnetization which are particularly relevant in practice will first be explained with exemplary character with reference to FIGS. 2 to 5 for a better understanding.

FIGS. 2 to 5 show in each case a plan view of the permanent magnetic rotor 1; the arrows without reference symbols symbolically indicate the distribution of the magnetization in the rotor 1; the arrow designated by the reference symbol RM symbolically represents the direction of the resultant rotor magnetization. The rotor magnetization can usually be described by a rotor magnetization function. This specifies substantially the magnetic flux which is produced by the permanent magnetic rotor 1 in the air gap between the stator 2 and the rotor 1 in dependence on an angular variable, which e.g. specifies the polar angle of the respective point in the X'-Y' plane of the rotor system. This shall be clarified with an example. If for example the rotor is magnetized sinusoidally, then this means that the rotor magnetization function is a sine function. If one measures the magnetic flux along the periphery of the rotor 1 as a function of the polar angle in the X'-Y' plane for a rotor magnetization of this kind when the rotor 1 is standing still, then a sine function results. Or, what is equivalent, one measures the flux produced by the permanent magnetic rotor 1 at a fixed location in the air gap between the rotor 1 and the stator 2, e.g. on the X axis of the stator system, and rotates the rotor 1 by 360° about the desired axis of rotation A. The thus measured magnetic flux is then a sine function of the rotor angle.

Figure 2:
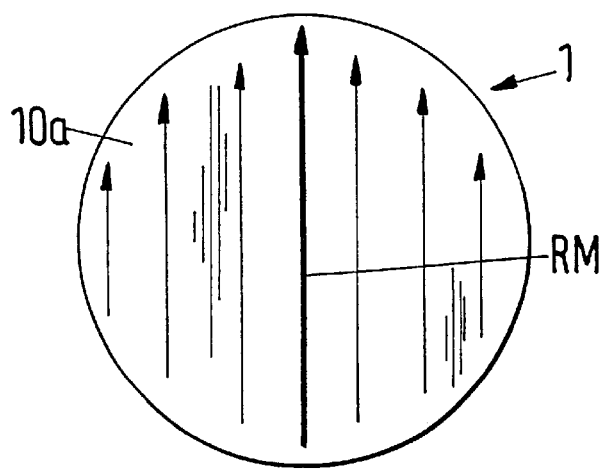

FIG. 2 shows a disc-shaped embodiment of the rotor 1 with a permanent magnetic disc 10a. The disc 10a is bipolar (number of pole pairs 1), sinusoidally magnetized, which means that the rotor magnetization function for this rotor 1 is a sine function which has the same periodicity as the geometric rotor angle. The direction of the rotor magnetization is symbolically illustrated by the arrow RM.

The rotor 1 in accordance with FIG. 3 is likewise designed as a bipolar, sinusoidally magnetized rotor 1. The rotor is however designed here as a ring-shaped rotor 1 with a permanent magnetic ring 10 and an iron yoke 11 which is arranged to lie radially inwardly with respect to the ring 10.

In the substantially ring-shaped embodiment of the rotor in accordance with FIG. 4 four permanent magnetic segments 10b are arranged around a common iron yoke 11b, with each segment 10b being sinusoidally magnetized and with segments 10b which lie opposite to one another being in each case magnetized in the opposite direction. This embodiment is a quadrupolarly, sinusoidally magnetized rotor 1, which means that its number of pole pairs is two and the rotor magnetization function is a sine function, the period of which is half as large as that of the rotor angle. Considered over the entire periphery the rotor magnetization function thus runs through two periods. In this embodiment the direction of the rotor magnetization RM is no longer unique, as is indicated by the two arrows RM.

FIG. 5 shows a ring-shaped embodiment of the rotor 1 with four permanent magnetic ring segments 10c which are arranged to lie adjacently in the peripheral direction in such a manner that they form a ring. Radially inwardly disposed with respect to this ring a ring-shaped iron yoke 11c is provided. Each ring segment 10c is homogeneously radially magnetized, with adjacent ring segments 10c in each case being magnetized in the opposite direction, which means that the ring segments 10c are alternatingly magnetized radially outwardly and radially inwardly. This embodiment is a rotor 1 which is quadrupolarly magnetized in a block pattern or in rectangular pattern. The rotor magnetization function is a rectangular function which, considered over the entire periphery, runs through its period twice. Here as well the direction of the rotor magnetization RM is no longer unique, as is indicated by the two arrows RM.

Naturally other rotor magnetizations are also possible in a similar manner, for example ones with higher numbers of pole pairs and qualitatively different rotor magnetization functions, e.g. trapezoidal magnetizations.

Through the invention a sensor arrangement and a method respectively will now be proposed in order to determine the momentary position or direction of the rotor magnetization RM in the stator system. For unique rotor magnetizations (see FIGS. 2 and 3) the geometric rotor angle is then also known at the same time; for non-unique rotor magnetizations (see FIGS. 4 and 5) two different rotor angles differing by 180° or in general by a plurality of geometrical rotor angles belong to each position of the rotor magnetization. This involves no restriction in practice however since these two or more rotor angles belong to magnetically equivalent angular positions of the rotor 1 in the stator 2 so that with the direction of the rotor magnetization in the stator system the geometric rotor angle is also de facto known for non-unique rotor magnetizations.

In accordance with the invention the determination of the direction of the rotor magnetization RM with respect to the stator system takes place with the help of two sensors for the determination of a magnetic flux which are arranged in such a manner that partial fluxes of that magnetic flux can be determined with them which the stray field of the permanent magnetic rotor 1 produces. The flux produced by the rotor 1 can be divided into the main flux and the stray flux, with the main flux being that magnetic flux which is led from the rotor 1 through the air gap between the rotor 1 and the stator 2 to the stator 2 and the stray flux comprising all other magnetic flux which is produced by the permanent magnetic rotor 1. By the stray field of the rotor 1 is then meant the field which is linked with the stray flux, thus in particular the axial stray field of the rotor 1 which the rotor 1 produces in the space adjacent to it with respect to the axial direction, but also that field which is produced by the rotor 1 and which is described by field lines which extend between the rotor 1 and the stator 2, but however extend outside the air gap. This last named part of the stray field will be designated in the following as the radial stray field.

Figure 6:
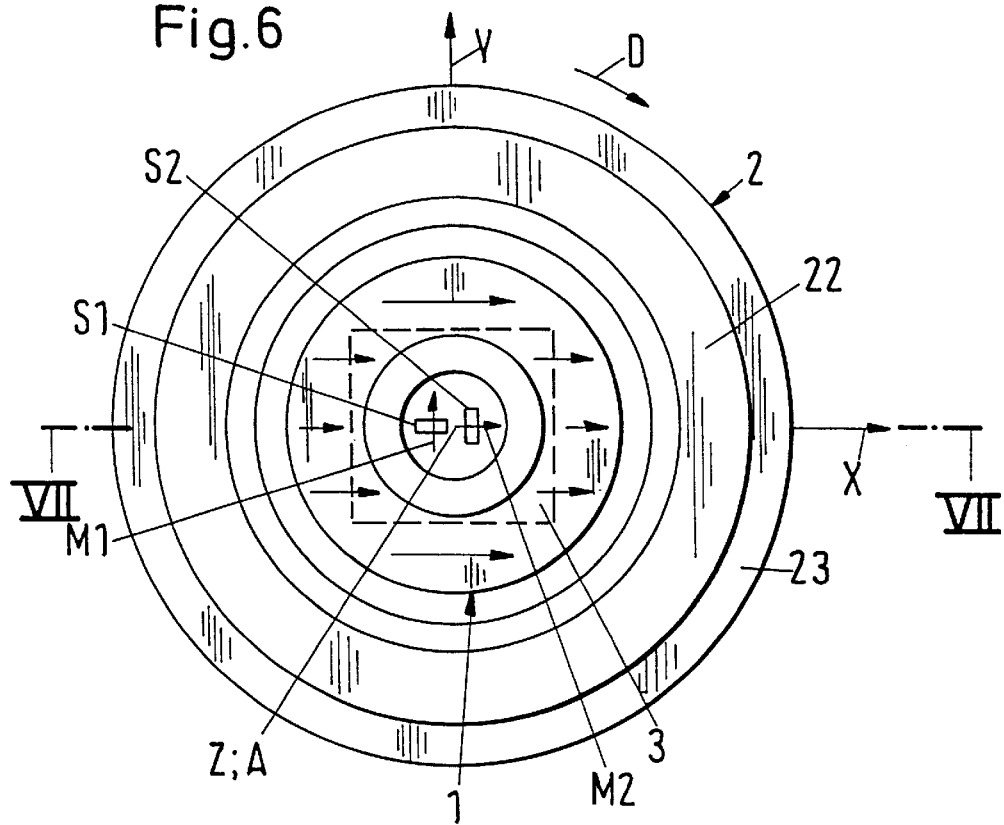
FIG. 6 is a plan view of an exemplary embodiment of the sensor arrangement in accordance with the invention (stator teeth not illustrated)
Figure 7:
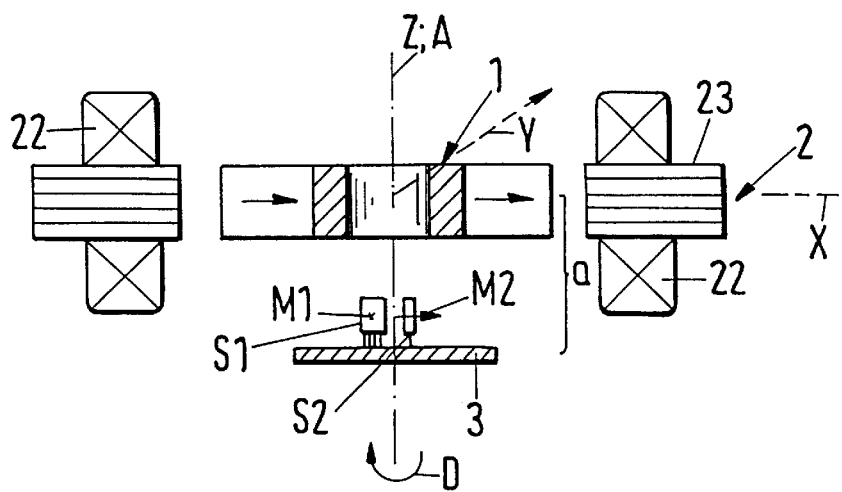
FIG. 7 is a section through the exemplary embodiment in accordance with FIG. 6 along the section line VII—VII in FIG. 6, FIGS. 8 to 10 are illustrations of the distribution of the magnetic stray field in each case for different bipolarly magnetized rotors.

FIG. 6 shows a plan view of a first exemplary embodiment of the invention which is suitable in particular for bipolarly magnetized rotors 1. In FIG. 7 a section along the line VII—VII through the exemplary embodiment of FIG. 6 is illustrated. The stator 2 with a stator lamina packet 23 and the electrical windings 22 which are wound around the stator teeth is only symbolically indicated. The rotor 1 is designed as a disc-shaped bipolarly magnetized rotor 1 in accordance with the embodiment in FIG. 3. The direction of rotation of the rotor 1 is indicated by the arrow D. The axes X, Y, Z of the stator system are likewise drawn in. Furthermore, two sensors S1, S2 are provided for the determination of the magnetic flux and are mounted on a common component, for example a chip or an electronic print 3, which can be accommodated in a non-illustrated housing. The sensors S1, S2 are connected to a non-illustrated signal processing and evaluation unit. All sensors which are known per se can be used as sensors for the determination of the magnetic flux, such as e.g. magnetic field probes, Hall sensors, magnetoresistive probes or giant magnetoresistive (GMR) sensors. The sensors S1, S2 are arranged with a displacement from the rotor 1 with respect to the axial direction, beneath the rotor 1 in accordance with the illustration (FIG. 7). They are not located in the space between the stator 2 and the rotor 1, with that space which is surrounded by the stator being meant by this space, hence the air gap between the stator teeth 20 (FIG. 1) and the rotor 1 and the gaps 21 between the stator teeth 20. The sensors S1, S2 are arranged in a common measurement plane which lies parallel to the X-Y plane of the stator system and has a distance a from the latter. In this manner the sensors can measure the axial stray field of the rotor 1 at their respective location. The sensor S1 is arranged in such a manner that it measures the partial flux of the axial stray field of the rotor 1 in a first measurement direction, which is illustrated by the arrow M1, with the components of the axial stray field in the first measurement direction M1 being meant by this partial flux. The sensor S2 is arranged in such a manner that it measures the partial flux of the axial stray field in a second measurement direction, which is illustrated by the arrow M2, and which is different from the first measurement direction M1. Both measurement directions M1 and M2 however extend in each case perpendicular with respect to the desired axis of rotation A (Z axis of the stator system). In this exemplary embodiment the sensor S2 measures the diametral partial flux of the axial stray field at its location, and the sensor S1 the component which is perpendicular to it, which is approximately zero for the rotor angle illustrated (see also FIG. 8). In this arrangement thus the two measurement directions M1 and M2 are perpendicular to one another; in particular the first measurement direction M1 is parallel to the Y axis of the stator system and the second measurement direction M2 parallel to the X axis of the stator system.

The position and the direction of the rotor magnetization in the stator system respectively can be determined from these two partial fluxes, which are determined in the two different measurement directions M1 and M2, which in each case lie parallel to the X-Y plane.

For a better understanding FIGS. 8 to 10 qualitatively show the distribution of the stray field of the rotor 1 in each case for different bipolarly magnetized rotors 1. This comprises the axial and the radial stray field. In this the axial stray field is in each case that field which is represented by the field lines which are drawn in above and below the rotor 1 in accordance with the illustration. The field lines of the axial stray field which extend diametrically with respect to the rotor 1 and which are designated by the reference symbol FD represent in this the diametral partial flux of the axial stray field. The radial stray field is represented by the field lines which are provided with the reference symbol SR and which extend between the rotor 1 and the stator 2 but outside the air gap. In addition to the stray field of the rotor 1 the field in the air gap between the rotor 1 and the stator 2 which stems from the rotor 1 and which is linked with the main flux as well as the field in the interior of the rotor 1 is also indicated in each case. The sensors S1, S2 and the associated measurement directions M1, M2 are likewise illustrated. For the respectively illustrated rotor angle the sensor S2 measures in each case the diametral partial flux of the axial stray field at its location. Naturally it is also possible to arrange one or both of the sensors S1 and S2 in such a manner that partial fluxes of the radial stray field of the rotor 1 can be determined with it or with them. For this the sensors S1, S2 can be arranged in the region of the stator 2, for example at or in the vicinity of the stator lamina packet 23 (FIG. 7).

FIG. 8 shows the stray field for the disc-shaped rotor 1 with the permanent magnetic disc 10a as it is illustrated in FIG. 2. FIG. 9 shows the stray field for the ring-shaped rotor 1 with the permanent magnetic ring 10 and the iron yoke 11 as it is illustrated in FIG. 3. FIG. 10 shows the stray field for a ring-shaped rotor 1 with a permanent magnetic ring 10 but without an iron yoke 11.

FIG. 11 shows a typical plot of the two partial fluxes of the axial stray field which is determined by means of the sensors S1 and S2 for a bipolarly sinusoidally magnetized rotor 1 and for an arrangement of the sensors S1, S2 in which the two measurement directions M1 and M2 are perpendicular to one another, in a rotation of the rotor by 360° about the Z axis of the stator system. The curve KS1 represents the signal of the sensor S1, the curve KS2 the signal of the sensor S2. It can be recognized that for a sinusoidal magnetization of the rotor 1 the stray fluxes which are measured over a rotation of the rotor also behave at least approximately sinusoidally. Thus for an arbitrary rotor angle the direction of the rotor magnetization with respect to the stator system can be uniquely determined from the two partial fluxes. Through the partial fluxes which are determined by the sensors S1, S2 one knows in each case one point on the curve KS1 and one point on the curve KS2. With the help of these two points and of the known motor magnetization function the direction of the rotor magnetization can then be uniquely determined, e.g. trigonometrically.

If the rotor 1 is for example magnetized in a block pattern then the partial fluxes of the axial stray field which are measured over a rotation of the rotor are admittedly no longer exactly sinusoidal, but nevertheless—in contrast to the field distribution in the air gap between the rotor 1 and the stator 2—continuously variable, which means that in an illustration corresponding to FIG. 11 there exist substantially no "plateaus" on which the measured partial flux is constant over a larger angular region. The direction of the rotor magnetization can then be uniquely determined from the measured partial fluxes through a trigonometric analysis, e.g. by means of a trigonometric function of higher order, or through a comparison with a stored electronic look-up table.

FIG. 12 shows a plan view of a second exemplary embodiment of the invention which is suitable in particular for quadrupolarly (number of pole pairs 2) magnetized rotors 1. The illustration of the stator 2 was dispensed with in FIG. 12; merely the axes of the stator system are drawn in. In FIG. 13 a section along the line XIII—XIII through the exemplary embodiment in accordance with FIG. 12 is illustrated, with the stator 2 being indicated in addition. The rotor 1 is designed as a disc-shaped rotor 1 which is magnetized quadrupolarly in a block pattern in accordance with the embodiment in FIG. 5. The respective magnetization of the four permanent magnetic ring segments 10c is indicated by the arrows M. The arrow D shows the direction of rotation of the rotor 1. The two sensors S1, S2 for the determination of the magnetic flux are mounted on the common chip or electronic print 3 and connected to the non-illustrated signal processing and evaluation unit.

Figure 13A:
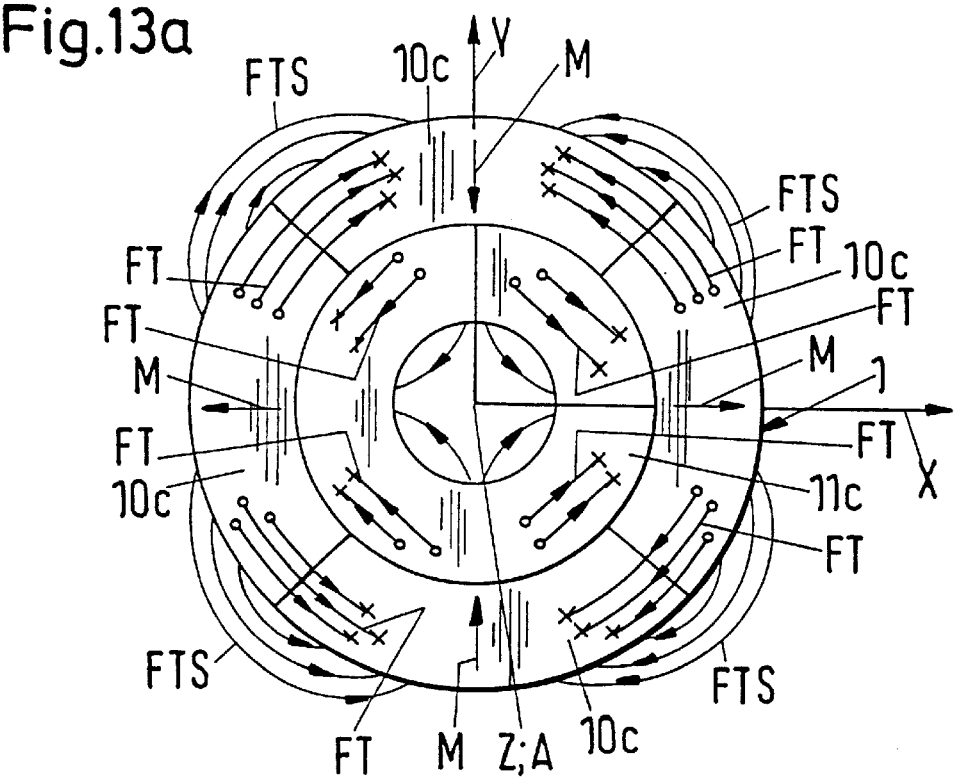
FIG. 13a is an illustration of the tangentially extending field lines of the stray field of a quadrupolarly magnetized rotor.
Figure 13B:
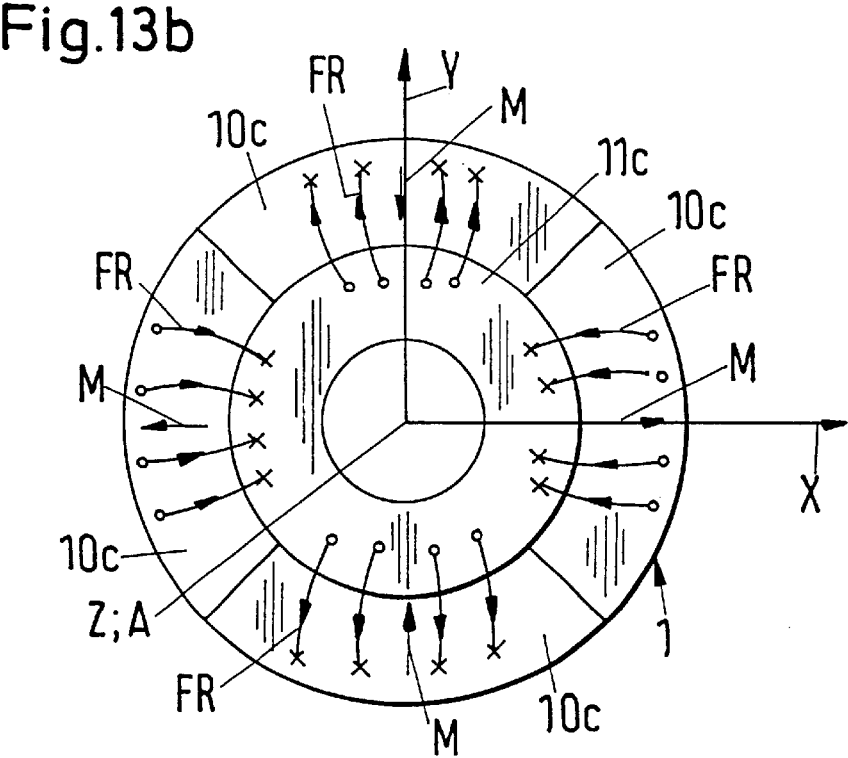
FIG. 13 is a section through the second exemplary embodiment in accordance with FIG. 12 along the section line XIII—XIII in FIG. 12.

For a better understanding the stray field of this rotor 1, which is magnetized quadrupolarly in a block pattern, is illustrated in FIGS. 13a and 13b. In FIG. 13a only the tangentially extending field lines FT, FTS of the stray field, that is, those extending in or opposite to the direction of rotation D, are drawn in. The field lines FTS, which are drawn in outside the rotor 1 with respect to the radial direction, extend in the plane of the drawing and belong to the radial stray field of the rotor 1. The tangential field lines FT which are drawn in above and below the rotor 1 respectively emerge from the plane of the drawing in each case at the locations which are marked with the small circles and enter into the plane of the drawing at the locations marked with the small crosses. These field lines FT represent the tangential partial flux of the axial stray field of the rotor 1. In FIG. 13b only the radially extending field lines FR of the axial stray field of the rotor 1 are illustrated. These again emerge from the plane of the drawing at the locations which are marked with the small circles and enter into the plane of the drawing at the locations marked with the small crosses.

The sensors S1, S2 are arranged with a displacement from the disc-shaped rotor 1 with respect to the axial direction, below the rotor 1 in accordance with the illustration (FIG. 13), thus outside the space between the stator 2 and the rotor 1. The sensors S1, S2 are arranged in a common measurement plane which lies parallel to the X-Y plane of the stator system and has a distance a from the latter. Both sensors S1, S2 have the same radial distance from the Z axis of the stator system and are arranged in the plane of the measurement with a displacement by an angle β relative to one another with respect to the direction of rotation. In this exemplary embodiment the angle β is equal to 45°. The measurement directions M1, M2 of the sensors S1, S2 are illustrated by the arrows M1, M2. As FIG. 12 in particular shows, the sensors S1, S2 are arranged in such a manner that they in each case measure the tangential partial flux of the axial stray field of the rotor 1 at their respective location, that is, the partial flux oriented in or opposite to the direction of rotation D. Thus both measurement directions M1 and M2 extend in each case perpendicular with respect to the desired axis of rotation A (Z axis of the stator system) and extend at the angle of β=45° relative to one another. From a comparison with FIGS. 13a and 13b it can be recognized that in this arrangement of the sensors S1, S2 the one sensor measures a maximum precisely when the signal of the other sensor is substantially zero (see FIG. 16, above).

From the partial fluxes, which are determined by means of the two sensors S1, S2 in the two different measurement directions M1 and M2, which in each case lie parallel to the X-Y plane of the stator system, the momentary position and direction respectively of the rotor magnetization in the stator system can be determined in a manner analogous to that described for the first exemplary embodiment.

FIG. 14 shows a variant of the second exemplary embodiment in an illustration which is analogous to FIG. 12. The difference consists in that both sensors S1, S2 measure the radial partial flux of the axial stray field of the rotor 1 in the sensor arrangement in accordance with FIG. 14. Thus both measurement directions M1, M2 extend in each case radially outwardly when viewed from the Z axis. Since the sensors S1, S2 are also arranged with a displacement by an angle of β=45° to one another with respect to the direction of rotation, the two measurement directions M1, M2 extend in each case parallel to the X-Y plane of the stator system and form an angle of 45° with one another. From the comparison with FIGS. 13a and 13b it can again be recognized that in this arrangement of the sensors S1, S2 the one sensor also measures a maximum precisely when the signal of the other sensor is substantially zero (see FIG. 16, middle).

In FIG. 15 a further variant of the sensor arrangement is illustrated in an illustration which is analogous to FIG. 12. In accordance with this variant the two sensors S1, S2 are arranged substantially at the same location with an axial displacement from the rotor 1, with the sensor S1 measuring the radial partial flux of the axial stray field of the rotor 1 at this location and the sensor 2 the tangential partial flux. Thus the two measurement directions M1 and M2 again extend in each case parallel to the X-Y plane of the stator system, but however form an angle of 90° with one another. Through a comparison with FIGS. 13a, 13b it can be recognized that in this arrangement of the sensors S1, S2 the one sensor also measures a maximum precisely when the signal of the other sensor is substantially zero, since the maxima of the radial partial flux substantially coincide spatially with the minima of the tangential partial fluxes and vice versa (see FIG. 16, below).

FIG. 16 shows typical plots of the two partial fluxes which are determined by means of the sensors S1 and S2 for a rotor 1 which is quadrupolarly magnetized in a block pattern in a rotation of the rotor 1 by 360°. In this the curves KS1 and KS2 respectively represent in each case the signal measured by the sensors S1 and S2 respectively. The upper representation results for a sensor arrangement in accordance with FIG. 13, the middle one for a sensor arrangement in accordance with FIG. 14 and the lower one for a sensor arrangement in accordance with FIG. 15. It can be recognized that for a rotor 1 which is quadrupolarly magnetized in a block pattern the stray fluxes which are measured over a rotor rotation behave approximately sinusoidally, but at least sine-like. In particular the behavior of these curves KS1, KS2 is continuously variable, which means that there are no "plateaus" on which the partial flux is constant over a larger angular region. Thus for any arbitrary angular position the direction of the rotor magnetization with respect to the stator system can be determined from the two partial fluxes. Through the partial fluxes which are measured by the sensors S1, S2 one knows in each case a point on the curve KS1 and a point on the curve KS2. With the help of these two points and the known rotor magnetization function the direction of the rotor magnetization can then be determined through a trigonometric analysis, e.g. by means of a trigonometric function of higher order, or through a comparison with a stored electronic look-up table.

Naturally the sensors S1 and/or S2 can also be arranged in the second exemplary embodiment—as already explained further above—in such a manner that partial fluxes of the radial stray field can be determined with them. The direction of the rotor magnetization can also be determined in an analogous manner by means of such arrangements.

In addition to the sensor arrangements which are explicitly discussed here numerous other arrangements are naturally also possible; for example the sensors S1, S2 can be arranged at different distances with respect to the axial direction of the rotor 1; or the sensors S1, S2 can be arranged on different sides of the rotor; for example the sensor S1 can be arranged above the rotor and the sensor 2 below the rotor with respect to the illustration in FIG. 7 or 13 respectively.

Numerous variants are also possible with respect to the angle at which the two measurement directions M1 and M2 extend relative to one another. This angle is however preferably approximately 90° if the sensors S1 and S2 are substantially located at the same place. Insofar as the two sensors S1, S2 measure the same component of the stray field at their respective location, thus for example both sensors in each case measure the tangential partial flux at their location or both sensors S1, S2 in each case measure the radial partial flux or both sensors S1, S2 in each case measure the diametral partial flux, the angle between the two measurement directions M1 and M2 should be unequal to an integral multiple of the quotient of 180° divided by the number of pole pairs of the rotor, thus e.g. for a quadrupolarly magnetized rotor (number of pole pairs two), unequal to 90°, 180°, 270°. . . If these conditions are namely not fulfilled, then there exist certain rotor angles for which both sensors S1, S2 simultaneously lie at a zero crossing of the partial flux which is measured by them so that for this rotor angle the position of the rotor magnetization cannot be determined. In regard to a particularly reliable and simple processing and evaluation of the sensor signals, those arrangements of the sensors S1, S2 are preferred in which the first and the second measurement directions M1 and M2 extend at an angle relative to one another which is equal to the quotient of 90° divided by the number of pole pairs of the rotor 1 or to an odd multiple of this quotient respectively. Arrangements of this kind are for example shown in FIGS. 7 and 12.

A further advantageous measure consists in providing at least one further sensor S3 (see FIG. 17), thus a total of at least three sensors S1, S2, S3, with the sensor S3 being arranged in such a manner that the partial flux of the magnetic flux of the axial stray field of the rotor can be determined with it in a further measurement direction M3 which is different from the first and the second measurement directions M1, M2. A variant of this kind of the exemplary embodiment in accordance with FIGS. 6 and 7 is illustrated in FIG. 17. The three sensors S1, S2, S3 are arranged on a common component, for example a chip or an electronic print 3, which again can be accommodated in a non-illustrated housing. All three sensors S1, S2, S3 lie in the same measurement plane, which extends parallel to the X-Y plane of the stator system and lies with a displacement from the rotor 1 with respect to the axial direction. The sensors S1, S2, S3 are in each case oriented in such a manner that the radial partial flux of the axial stray field of the rotor 1 can be determined with them at their respective location. In the common measurement plane the sensors are arranged at different locations in such a manner that the three associated measurement directions M1, M2, M3 are uniformly distributed over 360°, which means that the angle between the first measurement direction M1 and the second measurement direction M2 is equal to the angle between the second and the third measurement direction M2, M3 and equal to the angle between the third and the first measurement direction M3, M1, namely 120°. Here as well all three measurement directions M1, M2, M3 lie parallel to the X-Y plane of the stator system.

In FIG. 18 a typical plot of the partial fluxes which are determined by means of the sensors S1, S2, S3—represented by the curves KS1, KS2 and KS3 respectively—is illustrated for a bipolarly magnetized rotor 1 in a rotation of the rotor by 360°. The advantage of this measure, of providing one or where appropriate a plurality of sensors S3, lies in that a redundancy or an error tolerance respectively can be realized because the position of the rotor magnetization in the stator system can already be determined from two of the three signals. It is self-evident that this measure can also be applied for other rotor magnetization functions and higher numbers of pole pairs.

In accordance with a further advantageous variant (see FIG. 19) each sensor S1, S2 comprises two sensor elements S11, S12 and S21, S22 respectively in each case which are arranged displaced to one another by 180° in the direction of rotation with respect to the desired axis of rotation A or the Z axis respectively. A variant of this kind is illustrated in FIG. 19 for the exemplary embodiment which is shown in FIG. 6. The two sensor elements S11 and S12 with the measurement directions M11 and M12 belong to the sensor S1; the two sensor elements S21 and S22 with the measurement directions M21 and M22 belong to the sensor S2. All sensor elements S11, S12, S21, S22 are arranged in the common measurement plane which lies parallel to the X-Y plane of the stator system. The sensor elements S11, S12 and S21, S22 respectively belonging to the same sensor S1 and S2 respectively are arranged to lie diametrically oppositely with respect to the Z axis. All measurement directions M11, M12, M21, M22 extend radially outwardly. With an arrangement of this kind systematic errors such as offset voltages, thermal drifts and common mode disturbances can be compensated, for example in that in each case the difference signal of the two sensor elements belonging to the same sensor are used for the determination of the direction of the rotor magnetization.

It is also advantageous to compensate stray fields which are produced by the electrical windings 22 of the stator 2, thus for example by the drive or the control winding. These stray fields are generally proportional to the drive currents or to the control currents respectively in the electrical windings of the stator 2. Thus these stray fields can be determined in a kind of calibration measurement in which the rotor 1 is not located in the stator 2. The stray fields of the stator 2 which are determined in a calibration measurement of this kind with the help of the sensors S1, S2 can be stored in a memory, for example an EPROM. In the operation of the bearing-free motor (with rotor 1) then the stray fields which are caused by the stator can be computationally compensated with reference to the stored data.

A particular advantage of the arrangement in accordance with the invention and of the method in accordance with the invention respectively lies in that the axial position of the rotor 1 with respect to the stator 2 can also be determined in addition to the direction of the rotor magnetization in the stator system without further sensors being required for this. The strength of the magnetic stray field of the rotor is namely also dependent on the axial distance from the rotor 1. This relationship between the strength of the stray field and the axial distance from the rotor 1 is naturally dependent on the special construction of the rotor 1, e.g. the geometry of the magnet 10, 10a or of the magnet segments 10b, 10c respectively and of the iron yoke 11, 11a, 11b, 11c, the magnet material, the degree of saturation of the iron and the number of pole pairs, but can however be determined for each rotor 1 by measurement technology and stored in an electronic look-up table. During the operation of the bearing-free motor the axial position of the rotor 1 can then be determined from the partial fluxes which are determined with the sensors S1, S2 with the help of this electronic look-up table.

As a first example FIG. 20 shows the amplitude BS of the axial stray field for a diametrically magnetized permanent magnetic disc 10a (see FIG. 2) of NdFeB as a function of the distance from the rotor 1. This unique relationship is for example stored in the look-up table. During the operation of the bearing-free motor the amplitude or the magnitude of the axial stray field respectively of the rotor 1 can be determined from the partial fluxes which are determined by means of the two sensors S1, S2. Since the stationary position of the two sensors with respect to the Z axis of the stator system is known, the momentary axial position of the rotor 1 with respect to the stator system can be uniquely determined through a comparison of the amplitude which is determined by measurement technologically with the stored look-up table.

As a second example FIG. 21 shows the magnitude I BS I (above) and the phase (below) of the axial stray field for a diametrically magnetized permanent magnetic disc 10a of NdFeB with an iron yoke 11 (see FIG. 3) as a function of the axial distance from the rotor 1. The associated axial stray field corresponds to that illustrated in FIG. 9. As FIG. 21 shows, the magnitude first decreases with increasing distance until it becomes zero, then increases again, reaches a maximum and then decreases continuously with the distance. The maximum lies at approximately one-fourth of the outer diameter of the permanent magnetic ring 10. The phase plot (FIG. 21, below) shows a jump by 180° at the minimum of the magnitude, which corresponds to a change of sign.

In a quadrupolarly magnetized rotor 1 and an arrangement of the sensors S1, S2 in accordance with one of FIGS. 12, 14, 15 the plot of the amplitude or of the magnitude respectively of the axial stray field of the rotor likewise has qualitatively the dependence illustrated in FIG. 21. If now the sensors S1, S2 are arranged at such a distance from the rotor 1 or, respectively, the distance a of the common measurement plane is chosen so large that the sensors S1 and S2 are located on the other side of the maximum (see FIG. 21, above), then a unique relationship between the amplitude of the two determined partial fluxes and the axial position of the rotor exists. From the two partial fluxes the axial position of the rotor 1 can thus also be determined in addition to the direction of the rotor magnetization, for example by means of an electronically stored look-up table for the relationship between the sensor amplitudes and the axial position of the rotor 1.

In accordance with a preferred further development of the sensor arrangement in accordance with the invention or of the method in accordance with the invention respectively, furthermore, at least two position sensors LS1, LS2 (see FIG. 25) are provided for the determination of the radial position of the rotor 1 with respect to the stator 2. The position sensors are then arranged in such a manner that the magnetic flux in the space between the rotor 1 and the stator 2 can be determined at two different measurement locations with them. With an arrangement of this kind, in addition to the direction of the rotor magnetization and the axial position of the rotor 1, its radial position in the stator 2 can also be determined.

Figure 22:
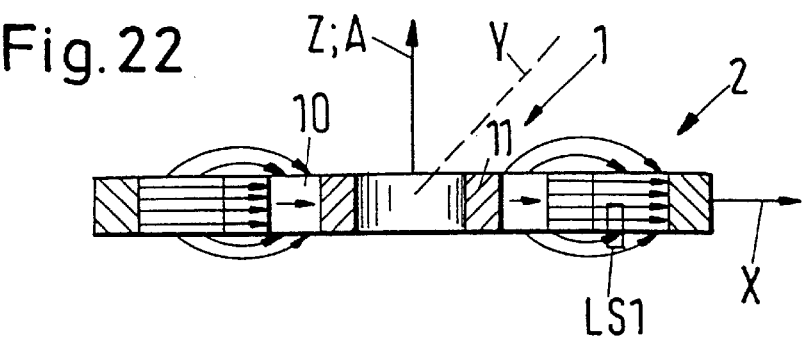
FIG. 22 is a sectional illustration for the clarification of the arrangement of the position sensors in an exemplary embodiment of a further development of the sensor arrangement in accordance with the invention.

All sensors which are known per se for the determination of a magnetic flux, such as e.g. magnetic field probes, Hall sensors, magnetoresistive probes or giant magnetoresistive (GMR) sensors, can be used as position sensors LS1, LS2. The position sensors LS1, LS2 can either lie completely in the space between the rotor 1 and the stator 2, thus e.g. in the X-Y plane of the stator system, or however also lie axially displaced with respect to this plane, for example in such a manner that they partially protrude in the axial direction out of the stator 2 or of the air gap respectively. An arrangement of this kind is illustrated in FIG. 22, which shows a section through an exemplary embodiment with position sensors LS1, LS2. In this sectional representation only one position sensor LS1 can be recognized (cf. also FIG. 25).

The position sensors LS1, LS2 are preferably arranged in each case in a gap 21 (FIG. 1) between two adjacent stator teeth 20 because through this measure the magnetic control flux which flows through the stator teeth 20 for the controlling of the rotor position is not also measured by the position sensors LS1, LS2. In principle it is naturally also possible to attach the position sensors LS1, LS2 in each case on the radial inner end of a stator tooth 20.

The determination of the radial position of the rotor 1 takes place with the help of the following parameters: magnetic flux distribution in the air gap with the rotor centered, direction of the rotor magnetization in the stator system, magnetic flux at the two measurement locations which can be determined by means of the two position sensors LS1, LS2. Before it is now explained how the determination of the radial position of the rotor 1 for example can take place, several parameters will first be defined or explained respectively with reference to FIG. 23. Since it is sufficient for the understanding, it will be assumed in the following for the sake of simplicity that the rotor 1 is not deflected with respect to the axial direction, and is thus located in the X-Y plane of the stator system. A deflection of the rotor 1 in the axial direction which may be present, and which can be measured as explained above with the sensor arrangement, can however be taken into account in a simple manner.

Figure 23:
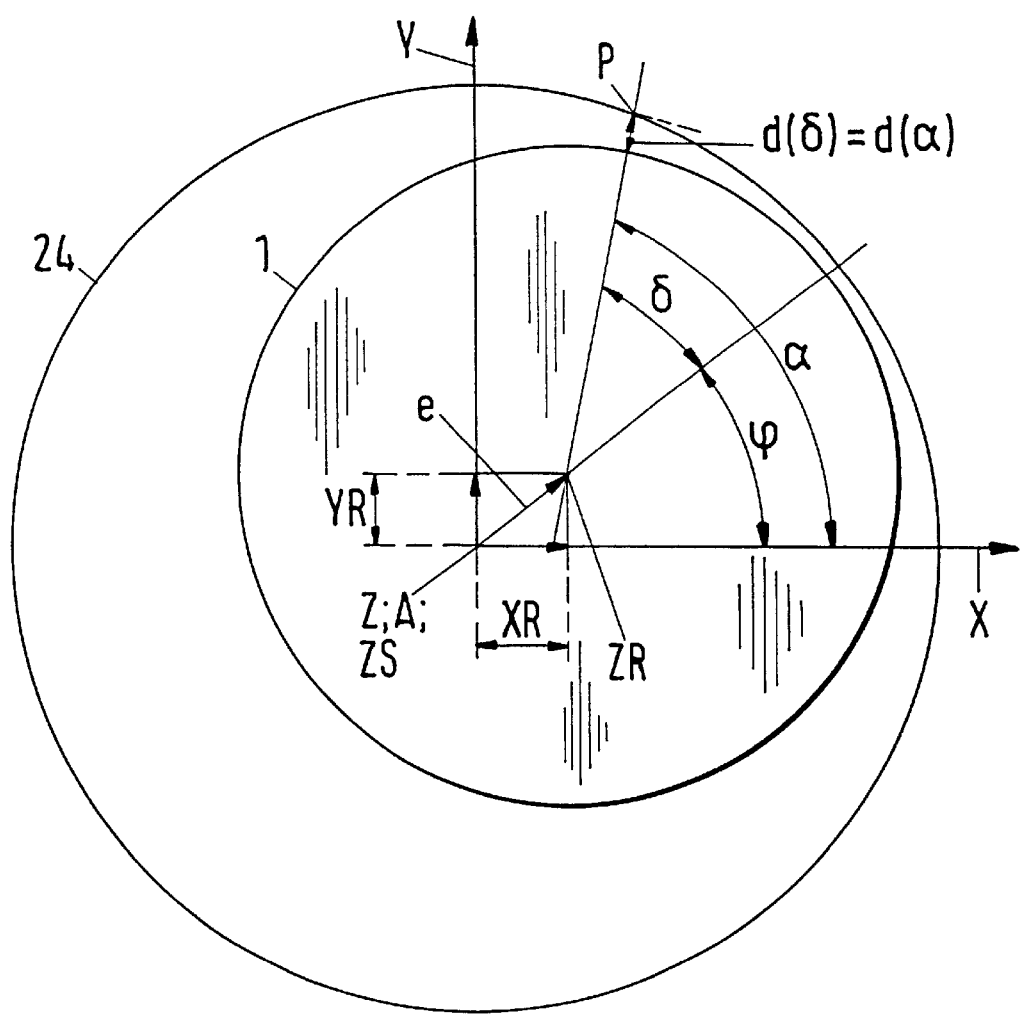
FIG. 23 is an illustration for the clarification of the definition of several angles and distances in the stator system.

In FIG. 23 the rotor 1 is illustrated by the inner circular line. The outer circular line represents the radial outer boundary 24 of the air gap between the rotor 1 on the one hand and the stator teeth 20 which are illustrated in FIG. 23 on the other hand, which means that the stator teeth 20 reach, coming from the outside, up to the radial outer boundary 24 of the air gap.

FIG. 23 shows the rotor 1 in an eccentric position. The center of the stator 2 is designated by ZS, that is, the origin of the stator system with the coordinate axes X, Y, Z. The Z axis is perpendicular to the plane of the drawing. ZR designates the center of the rotor 1, that is, the origin of the rotor system. If the rotor is centered with respect to its radial position, ZS and ZR coincide. The connection arrow between ZS and ZR describes the radial deflection of the rotor 1 from its centered position. The magnitude of the deflection, that is, the length of the connection arrow, is designated by e, the angle between the deflection of the rotor 1 and the X axis of the stator system by $\phi$. The deflection has the Cartesian coordinates XR and YR in the stator system. These are naturally also the Cartesian coordinates of the center of the rotor ZR or of the origin of the rotor system respectively measured in the stator system.

The distance of the rotor 1 from the radial outer boundary 24, thus the width of the air gap, is designated by d. The distance d is naturally dependent on the angle in the event of an eccentric position of the rotor 1. The two angular coordinates $\alpha$ and $\delta$ serve as running variables for the angle. If P is an arbitrary point on the radial outer boundary 24 then $\delta$ specifies the angle between the connection line of this point P with the center of the rotor ZR and the direction of the deflection, which is described by the angle $\phi$; $\alpha$ specifies the angle between the named connection line and the X axis of the stator system. Since for all cases which are relevant in practice the deflection e is very small, $\alpha=\phi+\delta$ to a very good approximation. The error of this approximation is typically less than 0.1° in practice. This means that to a good approximation $\alpha$ is the polar angle of the point P in the X-Y plane of the stator system measured against the X axis. The distance between the rotor 1 and the point P on the radial outer boundary 24 is designated by $d(\alpha)$ or $d(\delta)$ respectively. The angularly independent width of the air gap for the centered rotor 1 is designated by $d_0$, that is, for the case that ZR=ZS. For the distance $d(\alpha)$ or $d(\delta)$ respectively the following relationship holds:

$$d(\alpha)=d_0-e \cdot \cos(\alpha-\phi) \text{ and } d(\delta)=d_0-e \cdot \cos(\delta) \text{ respectively}$$

The magnetic flux distribution in the air gap between the rotor 1 and the stator 2 when the rotor 1 is centered, which means at the deflection e=0, can be described by a flux distribution function:

$$B_0(\alpha)=B_0^* \cdot f(\alpha),$$

with $B_0^*$ designating the amplitude and $f(\alpha)$ an angular function of $\alpha$. The index "0" indicates that this flux distribution function holds for the centered rotor 1. This flux distribution function $B_0(\alpha)$ can be determined from the rotor magnetization function and the rotor angle, which is designated by $\alpha_R$, or, respectively, from the direction of the rotor magnetization in the stator system. The rotor magnetization is known and the rotor angle $\alpha_R$ or the direction of the rotor magnetization in the stator system respectively can be determined by means of a sensor arrangement as has been explained further above, so that the flux distribution function $B_0(\alpha)$ can then be determined. A deflection of the rotor 1 with respect to the axial direction which may be present can be taken into account in the determination of $B_0(\alpha)$.

Figure 24:
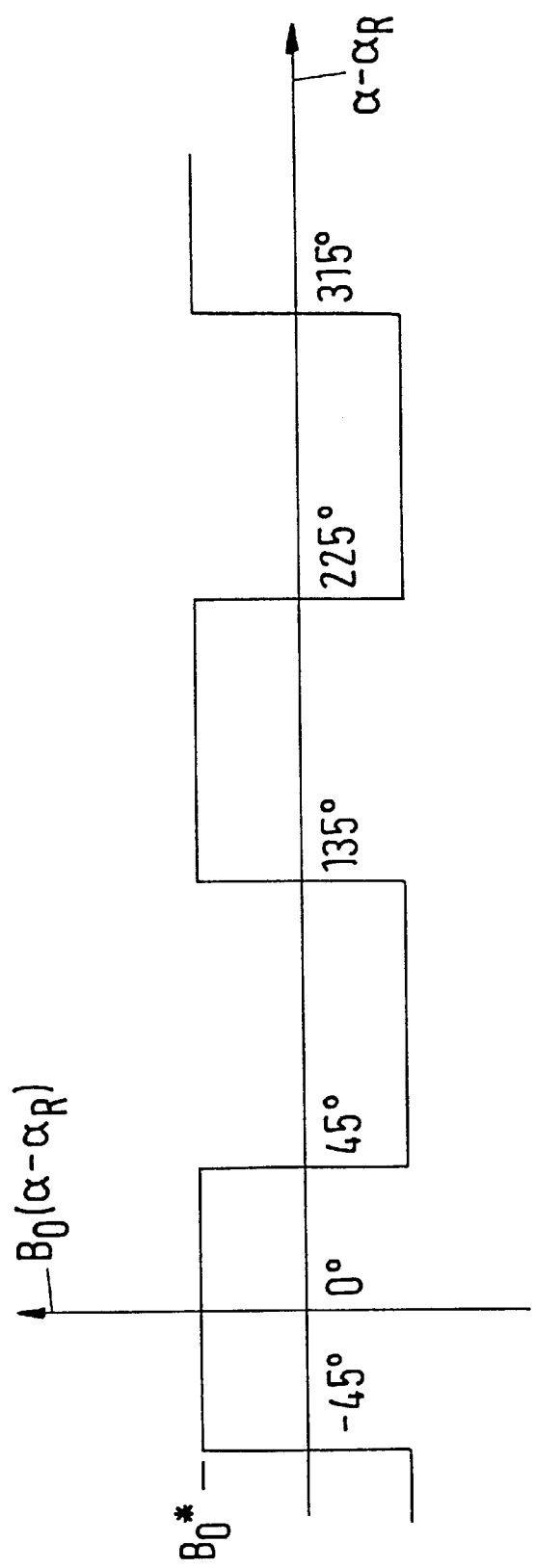
FIG. 24 is an illustration of the flux distribution function for a rotor which is quadrupolarly magnetized in a block pattern.

As an example for a flux distribution function $B_0(\alpha)$ in the air gap when the rotor 1 is centered, FIG. 24 shows such a flux distribution function $B_0(\alpha-\alpha_R)$ for a rotor 1 which is quadrupolarly magnetized in a block pattern (see FIG. 5) as a function of the angular difference $(\alpha-\alpha_R)$, with $\alpha_R$ being the rotor angle measured relative to the X axis. The influence of the grooving of the stator by means of the stator teeth 20 and the gaps 21 is not taken into account here for reasons of better clarity.

The flux distribution in the air gap for the eccentric rotor 1 with the deflection e is described by a flux distribution function $B_e(\alpha)$. For this, it holds that:

$$B_e(\alpha)=B_0(\alpha)\cdot d_0/d(\alpha)$$

With a dimensionless eccentricity $\epsilon=e/d_0$, there results:

$$B_e(\alpha)=B_0(\alpha)/[1-\epsilon\cdot\cos(\alpha-\delta)]$$

For $\epsilon<<1$, as a result of a series expansion, it holds that:

$$B_e(\alpha)/B_0(\alpha)\approx 1+\epsilon\cdot\cos(\alpha-\delta)$$

The two position sensors LS1, LS2 are placed in the stator system at locations which are described by the polar angles $\alpha_1$ and $\alpha_2$ (see FIG. 25), which means that the two different measurement locations are determined by the angles $\alpha_1$ and $\alpha_2$. Thus the value of the flux distribution function $B_e(\alpha)$ for the two angles $\alpha_1$ and $\alpha_2$, namely $B_e(\alpha_1)$ and $B_e(\alpha_2)$, is known as a result of the signals which are measured by the position sensors LS1, LS2. As has already been explained the flux distribution function $B_0(\alpha)$ can furthermore be determined for the centered rotor 1 so that the values of this function for the angles $\alpha_1$ and $\alpha_2$, namely $B_0(\alpha_1)$ and $B_0(\alpha_2)$, can also be determined. There thus result the two determining equations:

$$\epsilon\cdot\cos(\alpha_1-\phi)=[B_e(\alpha_1)/B_0(\alpha_1)]-1 \text{ and } \epsilon\cdot\cos(\alpha_2-\phi)=[B_e(\alpha_2)/B_0(\alpha_2)]-1$$

with which the two unknown parameters $\epsilon$ and $\phi$ can be calculated.

Thus the two Cartesian coordinates XR and YR of the deflection and thereby the position ZR of the center of the rotor 1 are known:

$$XR=d_0\cdot\epsilon\cdot\cos(\phi) \text{ and } YR=d_0\cdot\epsilon\cdot\sin(\phi)$$

As a consequence the radial position of the rotor 1 is known with respect to the stator system.

A particularly simple evaluation of the determining equations results for the case $\alpha_1=0°$ and $\alpha_2=90°$, which means when the first measurement location lies on the X axis and the second measurement location lies on the Y axis of the stator system.

In accordance with a preferred embodiment at least three position sensors LS1, LS2, LS3 are provided by means of which the magnetic flux can be determined in the space between the rotor 1 and the stator 2 at three different measurement locations. The positions of the position sensors LS1, LS2, LS3 or of the measurement locations respectively are described by the angles $\alpha_1, \alpha_2, \alpha_3$.

Through the provision of a third position sensor LS3 the following difficulty can be counteracted: Rotor magnetization functions which are realized in practice, e.g. sinusoidal, block-patterned or trapezoidal ones, and thereby also the flux distribution functions, often have one or more zero crossings. If now one such zero crossing lies precisely at the same angular position as one of the position sensors, for example at $\alpha_1$, —which occurs regularly when the rotor rotates—then the expression $B_e(\alpha_1)/B_0(\alpha_1)$ remains undetermined in the corresponding determining equation so that the parameters $\epsilon$ and $\phi$ no longer be uniquely determined for this rotor angle.

Therefore three position sensors LS1, LS2, LS3 are provided which are arranged in such a manner that for each rotational angular position of the rotor, that is, for each rotor angle $\alpha_R$, the angular position $\alpha_1, \alpha_2, \alpha_3$ of at least two measurement locations is different from the angular position of the zero crossings. The angles between the individual measurement locations are thus chosen in such a manner that at no position of the rotor 1 does more than one zero crossing of the rotor magnetization or of the flux distribution function respectively coincide with a measurement location.

As a result of the third position sensor LS3 or of the third measurement location respectively, which is described by the angle $\alpha_3$, one obtains a third determining equation:

$$\epsilon\cdot\cos(\alpha_3-\phi)=[B_e(\alpha_3)/B_0(\alpha_3)]-1$$

Due to the above-named arrangement of the position sensors LS1, LS2, LS3 at least two of the determining equations can always be evaluated so that the parameters $\epsilon$ and $\phi$ can be uniquely determined for an arbitrary rotor angle $\alpha_R$ with the help of these three position sensors LS1, LS2, LS3 and thus also the radial position of the center ZR of the rotor 1.

In practice it is advantageous to proceed in such a manner that in each case the two determining equations in which the magnitude of $B_e(\alpha)$ or $B_0(\alpha)$ are the greatest are used for the evaluation.

In the event that all three position sensors LS1, LS2, LS3 yield a sufficiently strong signal the system of the three determining equations is overdetermined. This state can be advantageous for the equalization of the three position sensors LS1, LS2, LS3, for example for an offset equalization, or for the compensation of other systematic errors such as e.g. thermal drifts.

The arrangement of the three position sensors LS1, LS2, LS3 will now be illustrated with reference to the concrete example of a rotor 1 which is quadrupolarly magnetized in a block pattern (see FIG. 5). The associated flux distribution function in the air gap for the centered rotor 1 is illustrated in FIG. 24. The measurement locations, described by the angles $\alpha_1, \alpha_2, \alpha_3$, are now to be chosen in such a manner that for no rotor angle $\alpha_R$ does more than one of the functional values $B_0(\alpha_1), B_0(\alpha_2), B_0(\alpha_3)$ correspond to a zero crossing. This condition is fulfilled in the event that none of the position sensors LS1, LS2, LS3 is arranged displaced by an angle of $k\cdot 90°$ (with $k=0, \pm1, \pm2, \pm\ldots$) with respect to another position sensor. As a consequence the difference $\alpha_i-\alpha_j$ must be different from $k\cdot 90°$ for all $i, j=1, 2, 3$ and $i\neq j$.

In practice at $\alpha-\alpha_R=45°\pm k\cdot 90°$ ($k=0, \pm 1, \pm 2, \pm\ldots$) as shown in FIG. 24 the vertical flanks of the function $B_0(\alpha-\alpha_R)$ are "smeared" over a finite angular region which can be described by an angle $\pm\alpha_S$ about the theoretical flank.

Therefore it is advantageous in practice to arrange the position sensors LS1, LS2, LS3 in such a manner that for each rotor angle $\alpha_R$ the angular position of at least two measurement locations lies outside this region of $\pm\alpha_S$ about the zero crossings of the rotor magnetization or of the flux distribution function respectively. The size of $\alpha_S$ naturally depends on the concrete design of the rotor 1. In the example described here it amounts for example to about 10°.

Taking this smearing into account, the position sensors LS1, LS2, LS3 are therefore preferably arranged in the example described here in such a manner that the following relationship holds for the angles $\alpha_1$, $\alpha_2$, $\alpha_3$ of the three measurement locations:

$$k \cdot 90° + \alpha_S < |\alpha_i - \alpha_j| < (k+1) \cdot 90° - \alpha_S \text{ with } i, j=1, 2, 3; i \neq j; k=0, \pm 1, \pm 2, \pm \ldots$$

Otherwise the angles $\alpha_1$, $\alpha_2$, $\alpha_3$ can in principle be chosen arbitrarily.

It is particularly advantageous, also in regard to a simple evaluation, when the position sensors LS1, LS2, LS3 are arranged in such a manner that the magnitudes of the angle differences $|\alpha_i - \alpha_j|$ are in each case equal to an integral multiple of 60°. An arrangement of this kind is shown in FIG. 25 for the rotor 1 which is quadrupolarly magnetized in a block pattern. In this example of the arrangement, $\alpha_1 = 90°$, $\alpha_2 = 30°$ and $\alpha_3 = -30°$. The zero crossings of the rotor magnetization function or of the flux distribution function respectively lie in each case at the partition surface between two adjacent permanent magnetic ring segments 10c. FIG. 25 shows in the upper figure the case that the position sensor LS1 lies at a zero crossing, which is the case for the rotor angle $\alpha_R = \alpha_1 + 45° \pm k \cdot 90°$. In the middle figure the position sensor LS2 lies at a zero crossing, which is the case for the rotor angle $\alpha_R = \alpha_2 + 45° + k \cdot 90°$. In the lower figure the position sensor LS3 lies at a zero crossing, which is the case for the rotor angle $\alpha_R = \alpha_3 + 45° + k \cdot 90°$. It can be recognized that in all cases two of the position sensors LS1, LS2 and LS3 are significantly remote from the zero crossings so that at least two of the position sensors LS1, LS2, LS3 always yield an evaluatable signal. Thus for each arbitrary rotor angle $\alpha_R$ the radial position of the rotor 1 with respect to the X-Y plane of the stator system can be determined.

For analogous reasons, as have already been explained above in connection with the sensors S1, S2, S3, it is also an advantageous measure with respect to the position sensors LS1, LS2, LS3 when each position sensor LS1, LS2, LS3 comprises two position sensor elements in each case which are arranged with a displacement of 180° in the direction of rotation of the rotor with respect to the desired axis of rotation A of the rotor or of the Z axis of the stator system respectively. This means that the position sensor, which is arranged at the angle $\alpha_i$ (i=1, 2, 3), comprises two position sensor elements, with the one being arranged at the angle $\alpha_i$ and the other at the angle $\alpha_i + 180°$. Through this pair-wise oppositely disposed arrangement of the position sensor elements systematic errors such as e.g. offsets or thermal drift can also be compensated here. Furthermore, it is possible to achieve a redundancy or an error tolerance respectively through arrangements with more than three position sensors.

It is self-evident that the sensor arrangement in accordance with the invention can naturally also comprise more than three position sensors LS1, LS2, LS3 and/or more than three sensors S1, S2, S3 for the measurement of the stray field of the rotor and, respectively, that the method in accordance with the invention can be carried out with more than three position sensors LS1, LS2, LS3 and/or more than three sensors S1, S2, S3.

Naturally the sensor arrangement in accordance with the invention or the method in accordance with the invention respectively is not restricted to the shapes of the rotor magnetization which are explicitly described here. They are in particular also suitable for permanent magnetic rotors with higher numbers of pole pairs and/or other patterns of the magnetization.

What is claimed is:

1. A process of utilizing a sensor arrangement in a bearing-free motor where the bearing free motor includes:
    a magnetically journalled, permanent magnetic rotor (1);
    a stator (2) designed as a bearing and drive stator to journal the permanent magnetic rotor (1) without contact by means of magnetic forces and to rotate the permanent magnetic rotor (1) by means of magnetic forces from the stator (2);
    a sensor arrangement serving for the determination of the direction of the rotor magnetization and/or of the axial position of the rotor (1);
    the magnetically journalled, permanent magnetic rotor generating a stray field;
    the improvement to the sensor arrangement comprising:
    providing at least two sensors (S1, S2, S3) for the determination of a magnetic flux;
    placing the at least two sensors with respect to the rotor (1) so that the partial fluxes resulting from a stray field of the permanent magnetic rotor (1) can be sensed; and,
    sensing by each of the at least two sensors the differing partial fluxes of the stray field to determine the magnitude and polarity at each sensor of the partial fluxes resulting from the stray field.

2. The process of utilizing a sensor arrangement in a bearing-free motor according to claim 1 including the further step of:
    placing the at least two sensors (S1, S2, S3) so that the partial fluxes of the magnetic flux can be determined in a first measurement direction (M1) and in a second measurement direction (M2), the measurement directions (M1, M2) extending in each case perpendicular with respect to an axial direction determined by a desired axis of rotation (A) of the rotor (1).

3. The process of utilizing a sensor arrangement in a bearing-free motor according to claim 2 including the further step of:
    placing the at least two sensors (S1, S2, S3) so that the first and the second measurement directions (M1, M2) extend at an angle with respect to one another which is equal to an integral multiple of a quotient of 90° divided by a number of pole pairs of the rotor.

4. The process of utilizing a sensor arrangement in a bearing-free motor according to claim 2 including the further steps of:
    providing at least one further sensor (S3); and,
    placing the at least one further sensor (S3) to enable the partial flux of the magnetic flux of the stray field of the permanent magnetic rotor (1) to be determined in a further measurement direction (M3) which is different from the first and the second measurement directions (M1, M2).

5. The process of utilizing a sensor arrangement in a bearing-free motor according to claim 1 including the further steps of:
    providing the rotor (1) in a ring shape; and,
    placing the at least two sensors (S1, S2, S3) so as to be displaced from the rotor (1) with respect to an axial direction determined by a desired axis of rotation (A) of the rotor (1).

6. The process of utilizing a sensor arrangement in a bearing-free motor according to claim 1 including the further step of:

placing the at least two sensors (S1, S2, S3) outside a space which is located between the rotor (1) and the stator (2).

7. The process of utilizing a sensor arrangement in a bearing-free motor according to claim 1 including the further step of:

placing the at least two sensors (S1, S2, S3) in a common measurement plane which extends perpendicular to an axial direction determined by a desired axis of rotation (A) of the rotor (1).

8. The process of utilizing a sensor arrangement in a bearing-free motor according to claim 1 including the further step of:

placing the at least two sensors (S1, S2, S3) so that first and the second measurement directions (M1, M2) extend at an angle with respect to one another which is approximately 90°.

9. The process of utilizing a sensor arrangement in a bearing-free motor according to claim 1 including the further step of:

providing each sensor (S1, S2, S3) with two sensor elements (S11, S12, S21, S22) which are displaced with respect to one another by 180° in a direction of rotation (D) of the rotor (1) with respect to a desired axis of rotation (A) of the rotor (1).

10. The process of utilizing a sensor arrangement in a bearing-free motor according to claim 1 wherein:

the provided at least two sensors (S1, S2, S3) measure flux chosen from the group consisting of diametrical fux, radial flux, and tangential partial flux.

11. The process of utilizing a sensor arrangement in a bearing-free motor according to claim 1 including the further steps of:

providing the stator (2) with a plurality of stator teeth (20) extending radially in a direction towards the rotor (1);

providing and placing at least two position sensors (LS1, LS2, LS3) for the determination of radial position of the rotor (1); and, placing the at least two position sensors to measure the magnetic flux in space between the rotor (1) and the stator (2) at two different measurement locations.

12. The process of utilizing a sensor arrangement in a bearing-free motor according to claim 11 including the further step of:

placing the position sensors (LS1, LS2, LS3) in each case in a gap (21) between two adjacent stator teeth (20).

13. The process of utilizing a sensor arrangement in a bearing-free motor according to claim 11 including the further steps of:

providing at least three position sensors (LS1, LS2, LS3); and, placing the at least three position sensors so that the magnetic flux in the space between the rotor (1) and the stator (2) can be determined at three different measurement locations, the position of which is such that for each rotor angle $\alpha_R$, an angular position of at least two measurement locations is different from an angular position of zero crossings of the rotor magnetization.

14. The process of utilizing a sensor arrangement in a bearing-free motor according to claim 11 including the further step of:

providing each position sensor (LS1, LS2, LS3) with two sensor elements which are displaced with respect to one another by 180° in a direction of rotation (D) of the rotor (1) with respect to a desired axis of rotation (A) of the rotor (1).

15. The process of utilizing a sensor arrangement in a bearing-free motor according to claim 1 including the further steps of:

providing the rotor (1) with a disc shape; and placing the at least two sensors (S1, S2, S3) so as to be displaced from the rotor (1) with respect to an axial direction determined by a desired axis of rotation (A) of the rotor (1).

16. The process of utilizing a sensor arrangement in a bearing-free motor according to claim 1 including the further step of:

placing the sensors at the same axial distance from the rotor (1).

17. The process of utilizing a sensor arrangement in a bearing-free motor according to claim 1 including the further steps of:

providing two sensor elements (S11, S12, S21, S22) to form the at least two sensors (S1, S2);

placing the two sensor elements (S11, S12, S21, S22) with respect to one another by 180° in the direction of rotation (D) of the rotor (1); and, determining the difference signals from two sensor elements (S11, S12, S21, S22) which in each case from a sensor (S1, S2) to determine the direction of rotor magnetization.

18. The process of utilizing a sensor arrangement in a bearing-free motor according to claim 1 including the further step of:

determining from the partial flux of the stray field of the rotor the axial position of the rotor.

19. The process of utilizing a sensor arrangement in a bearing-free motor according to claim 1 including the further steps of:

providing the stator with a plurality of stator teeth which extend radially in the direction towards the rotor (1);

placing the sensors to determine the magnetic flux in the space between the rotor and stator at two different measurement locations;

determining the radial position of the rotor using the direction of the rotor magnetization;

determining the magnetic flux at the measurement locations in the space between the rotor and the stator; and, determining the flux distribution in the air gap when the rotor is centered.

* * * * *